April 20, 1948. F. V. HART ET AL 2,439,889
LEVELING MACHINE
Filed Dec. 5, 1945 26 Sheets-Sheet 3

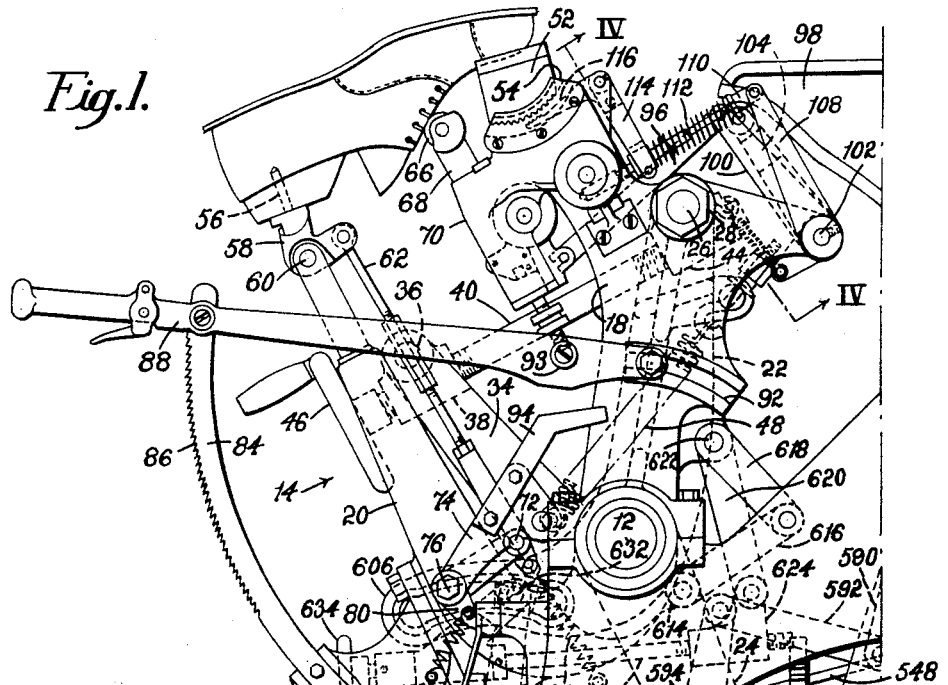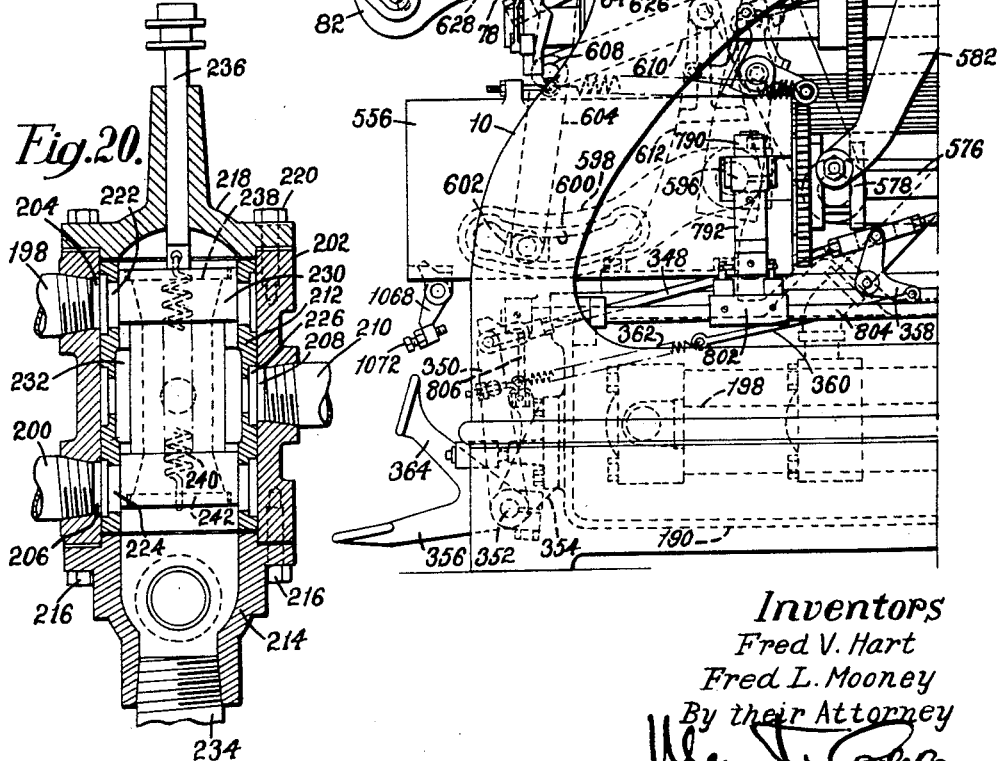

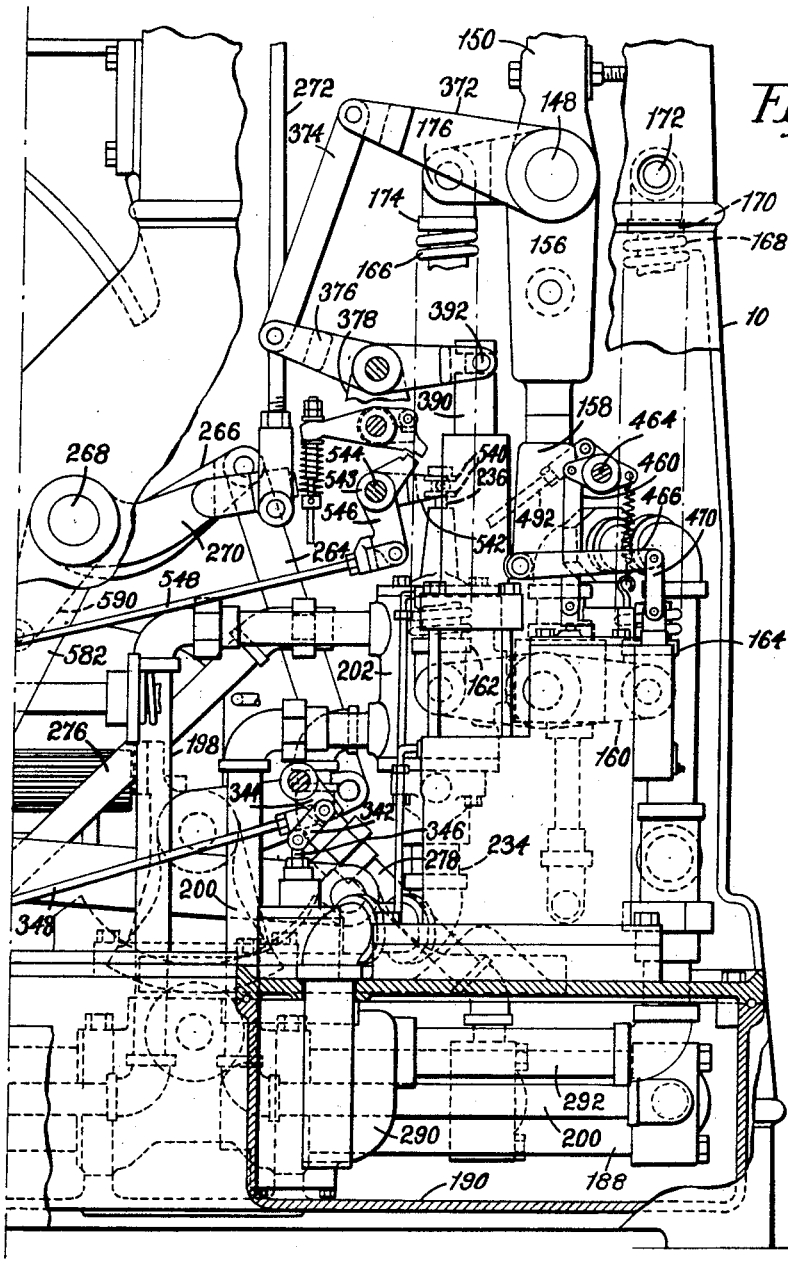

Inventors
Fred V. Hart
Fred L. Mooney
By their Attorney

Inventors
Fred V. Hart
Fred L. Mooney
By their Attorney

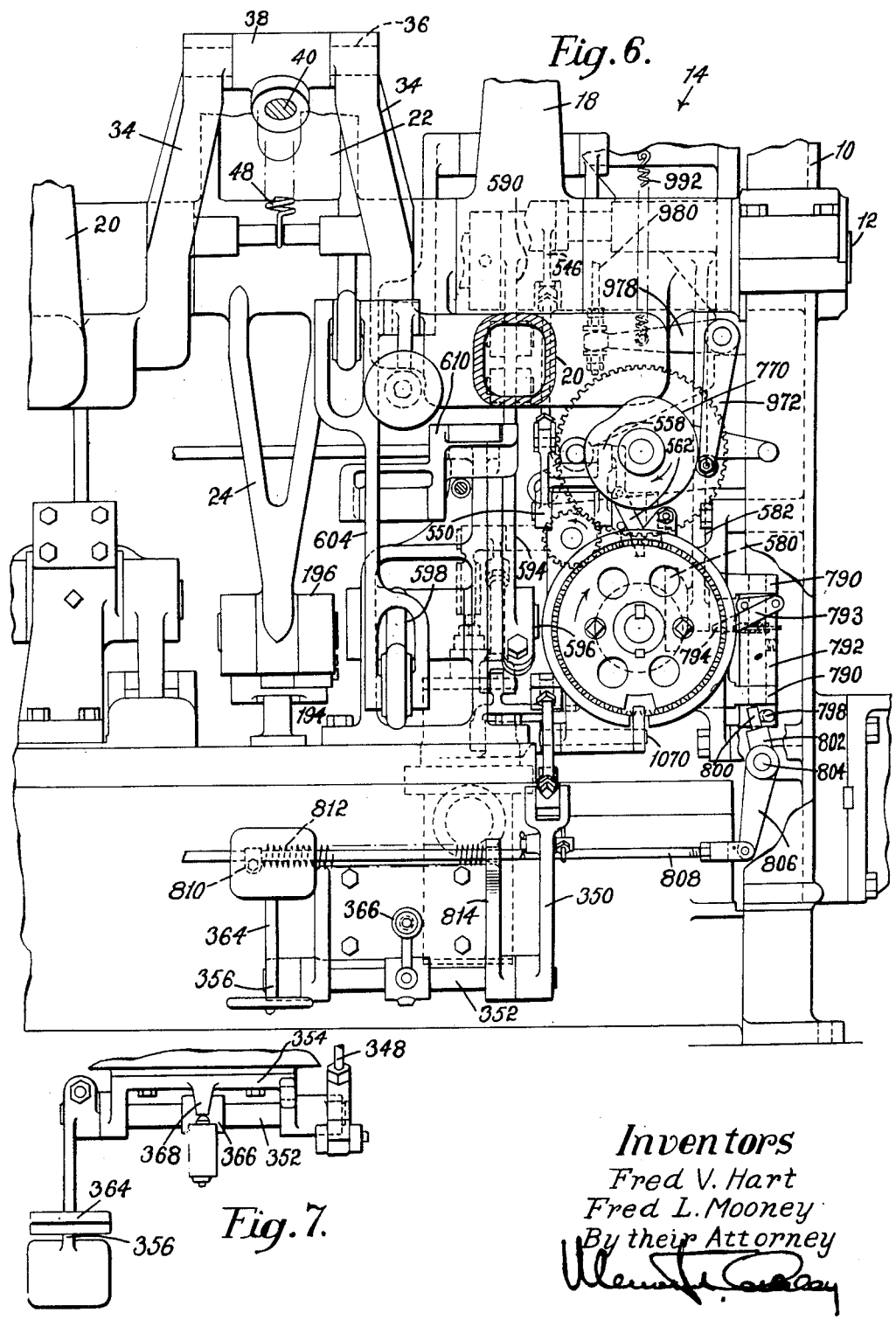

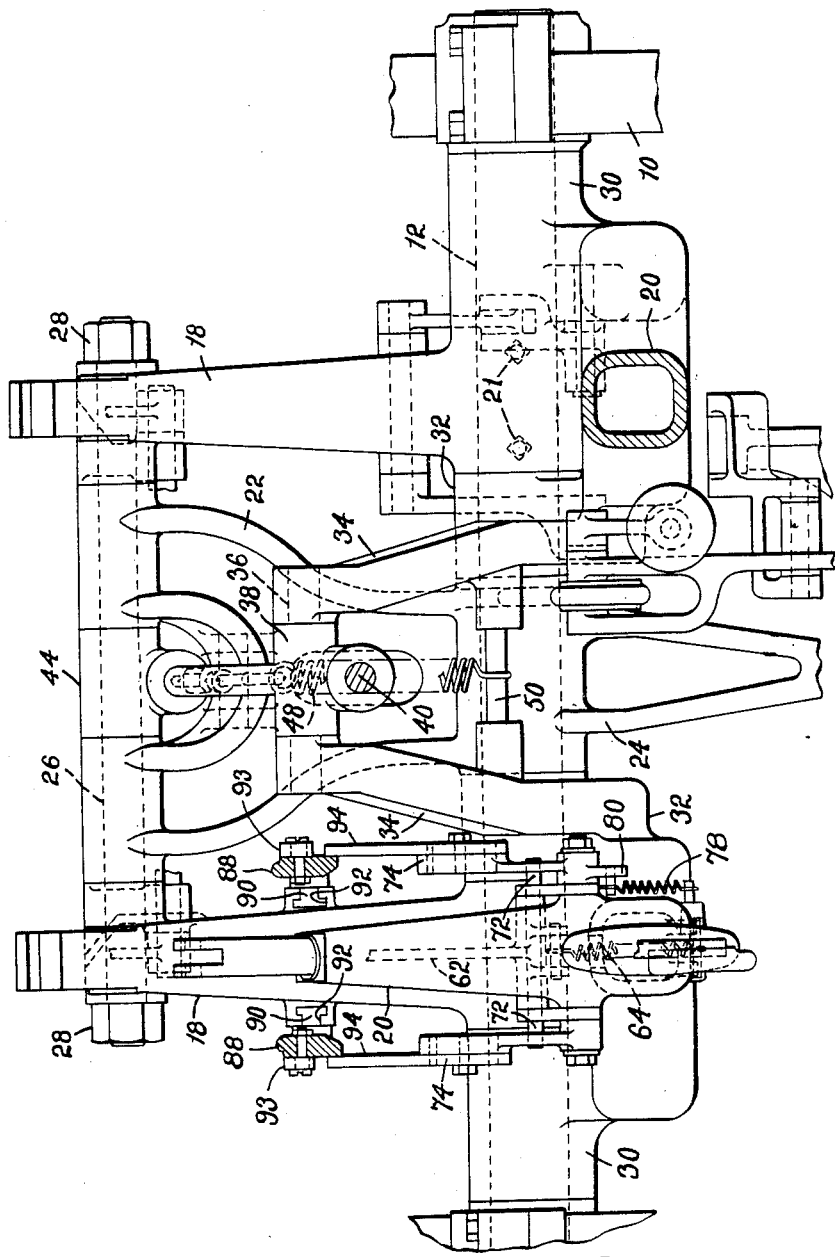

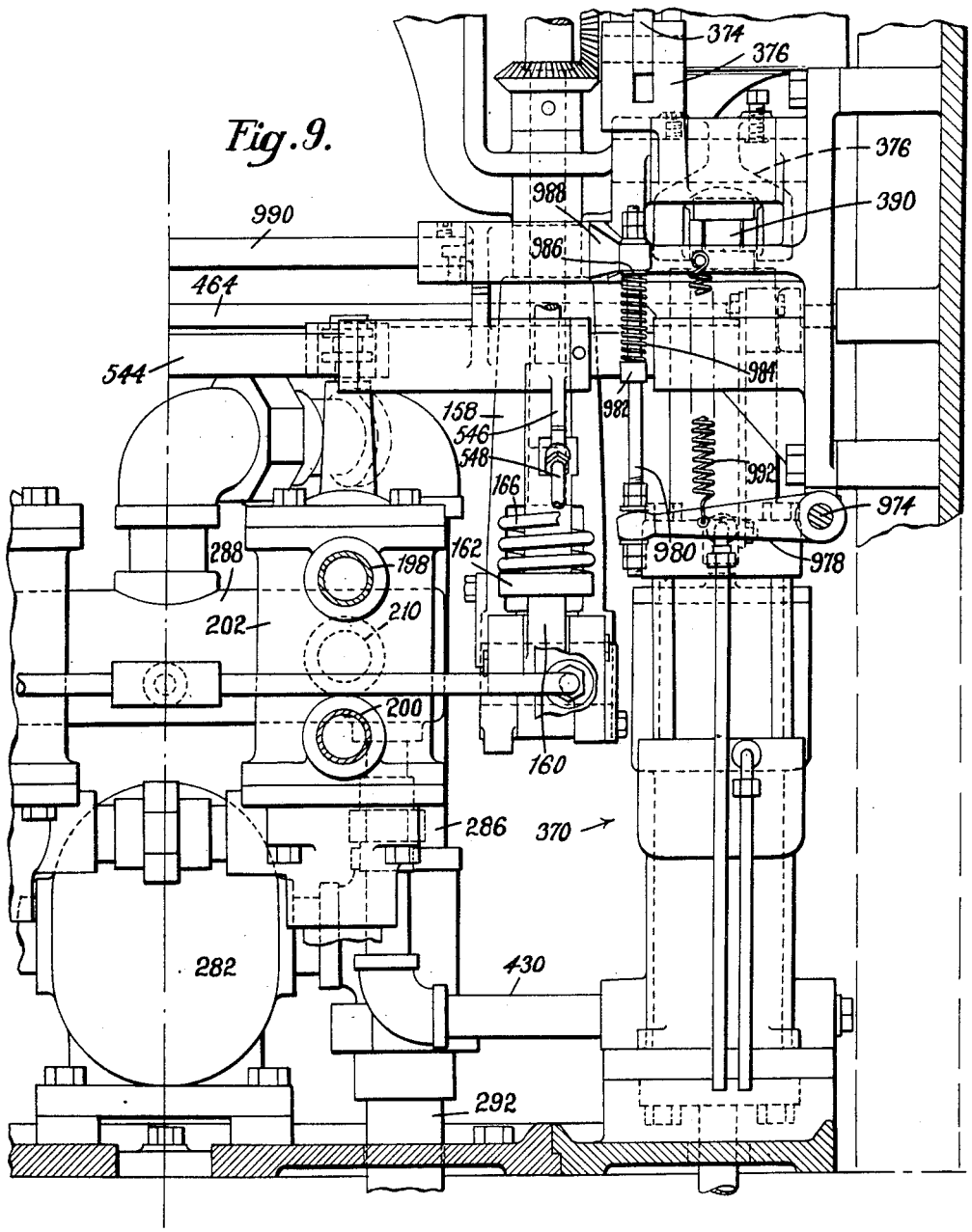

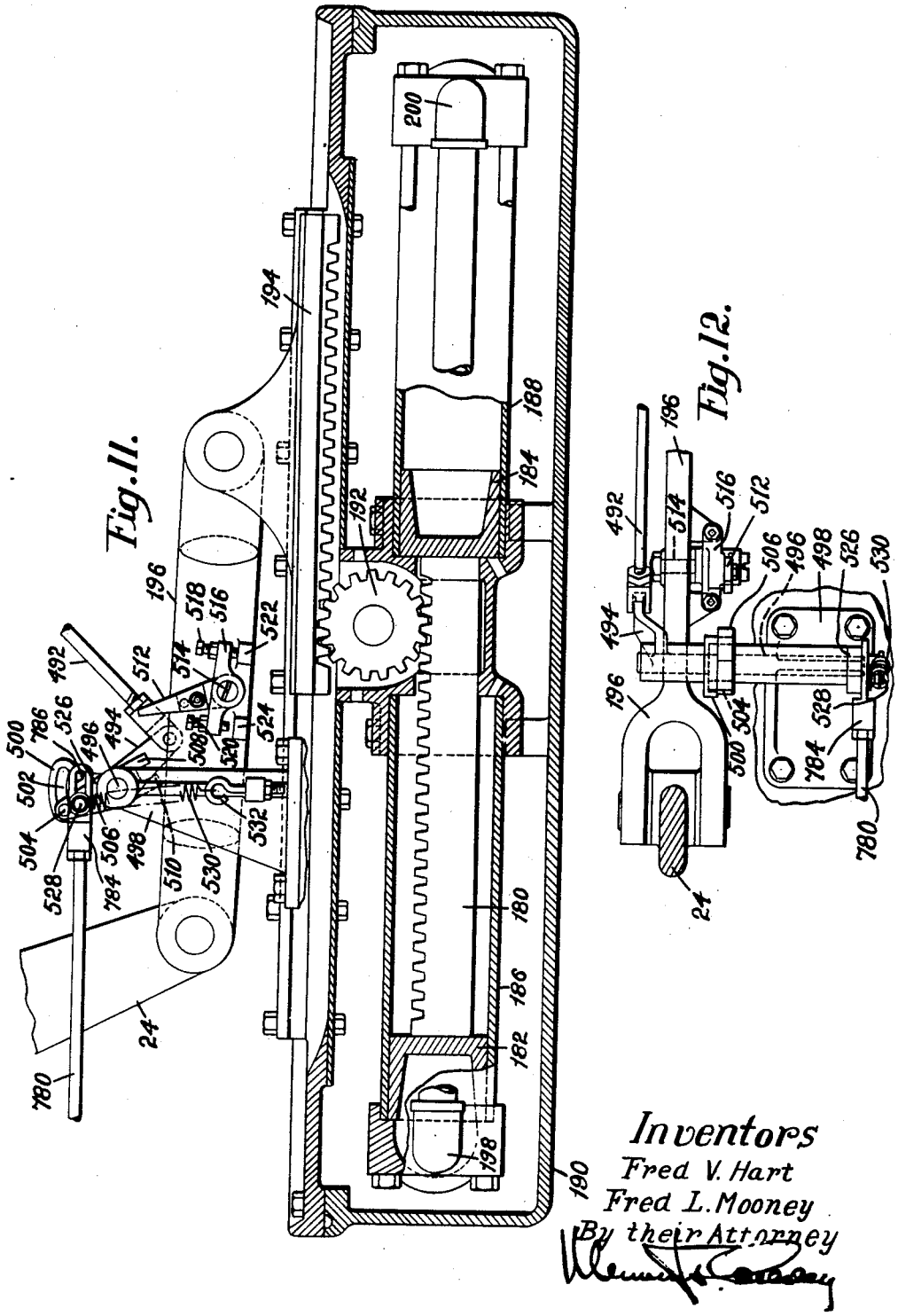

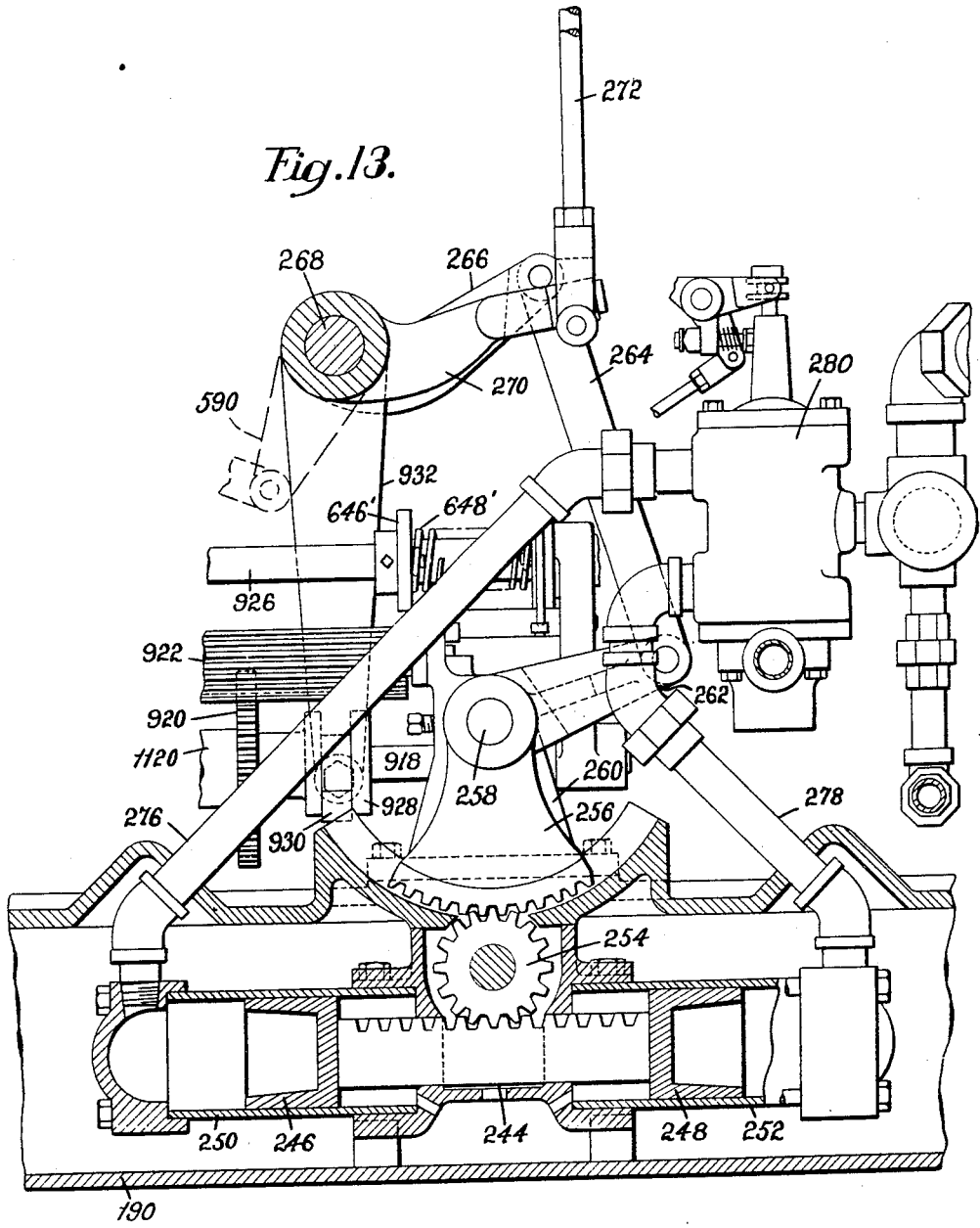

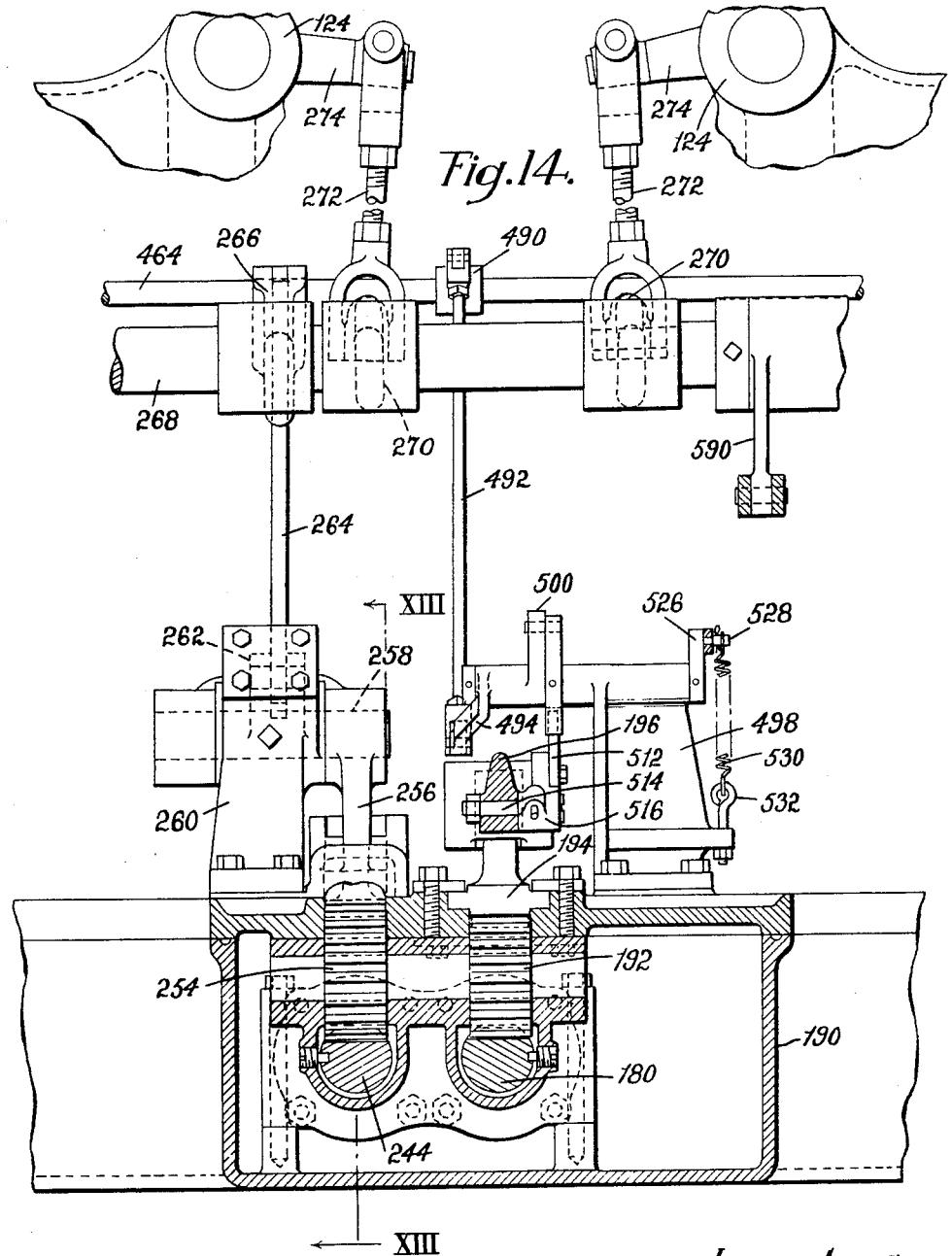

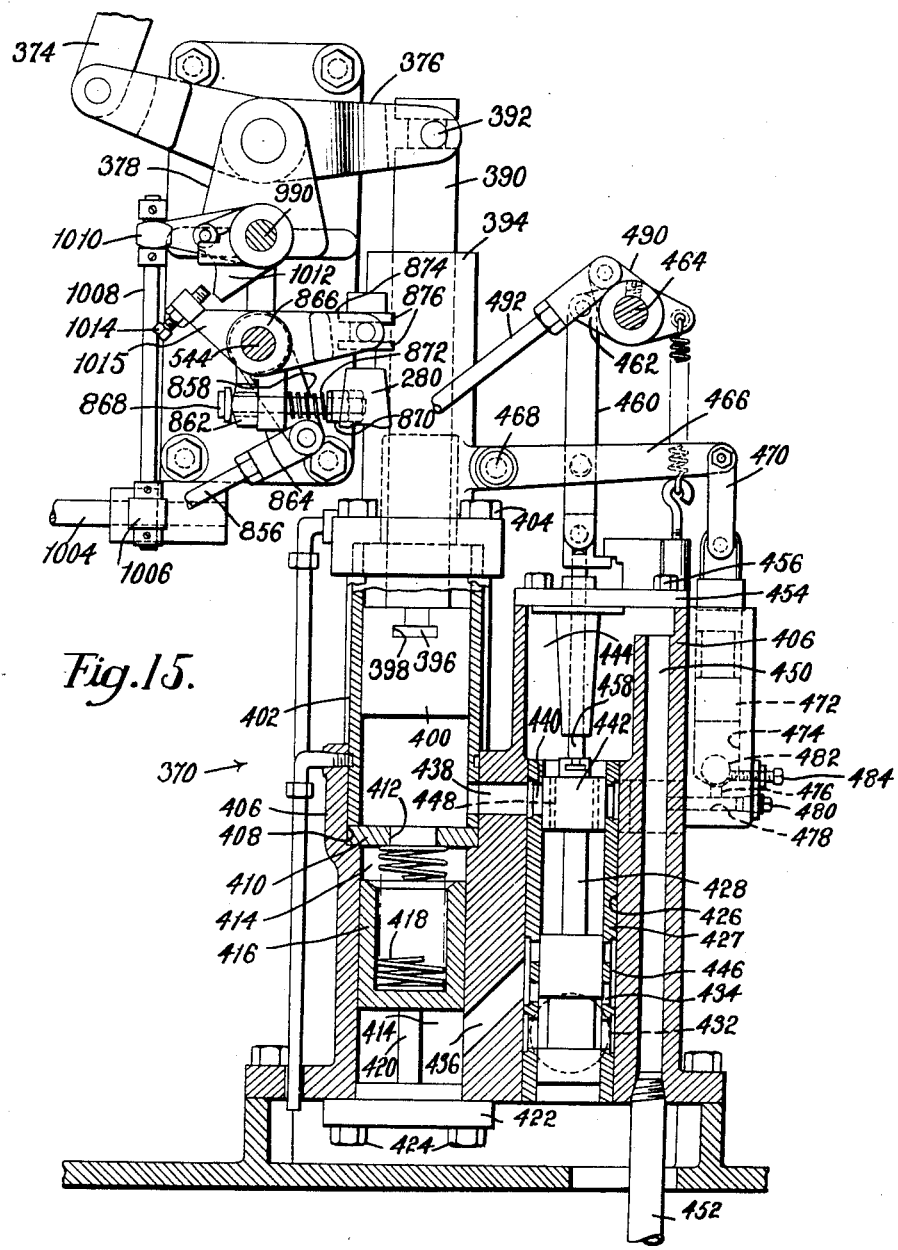

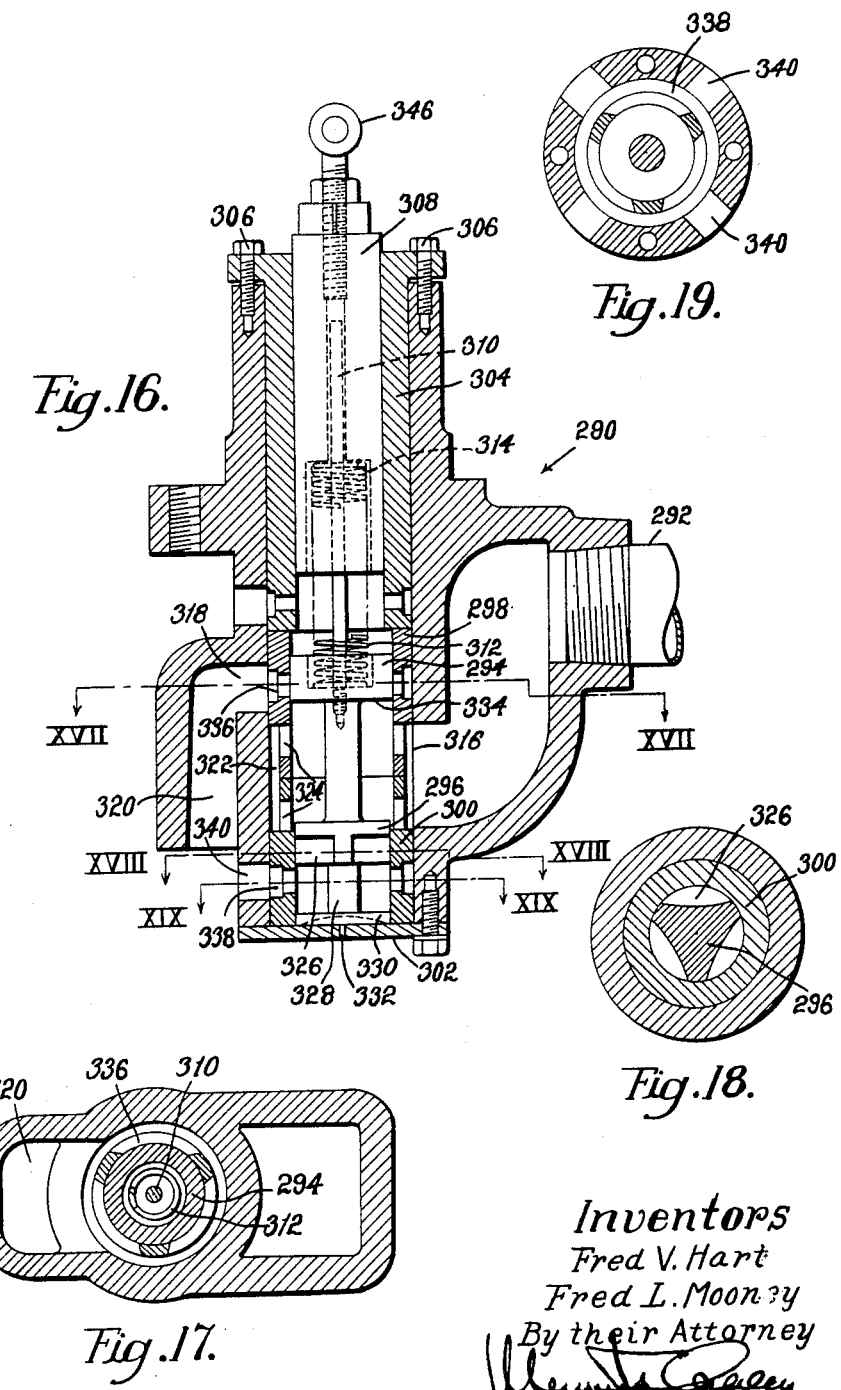

April 20, 1948. F. V. HART ET AL 2,439,889
LEVELING MACHINE
Filed Dec. 5, 1945 26 Sheets-Sheet 15

Inventors
Fred V. Hart
Fred L. Mooney
By their Attorney

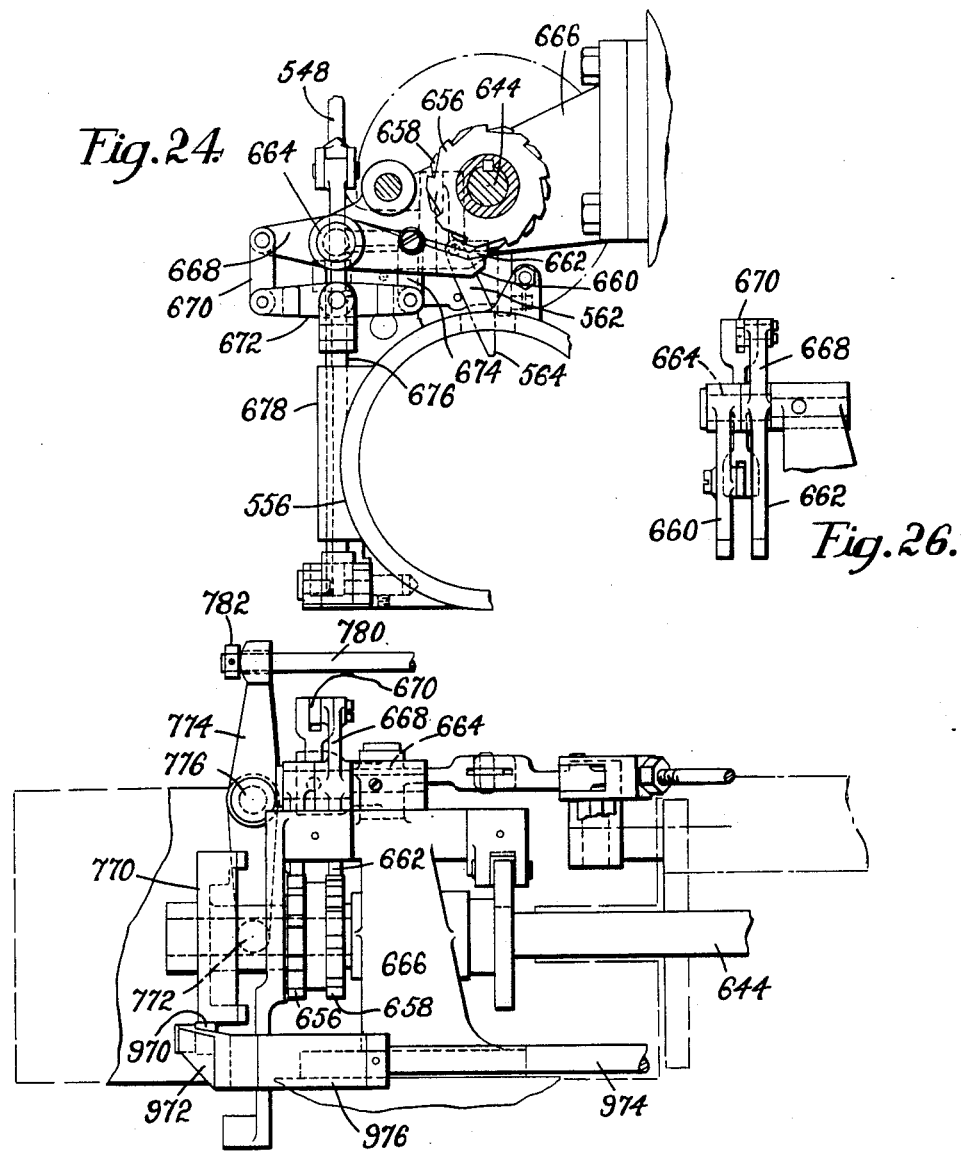

April 20, 1948.  F. V. HART ET AL  2,439,889
LEVELING MACHINE
Filed Dec. 5, 1945                26 Sheets-Sheet 17
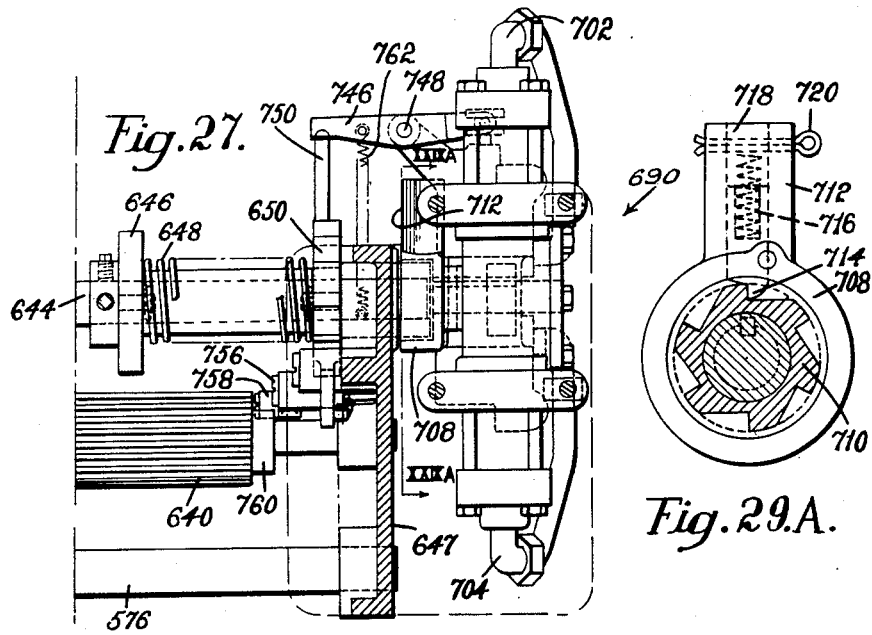
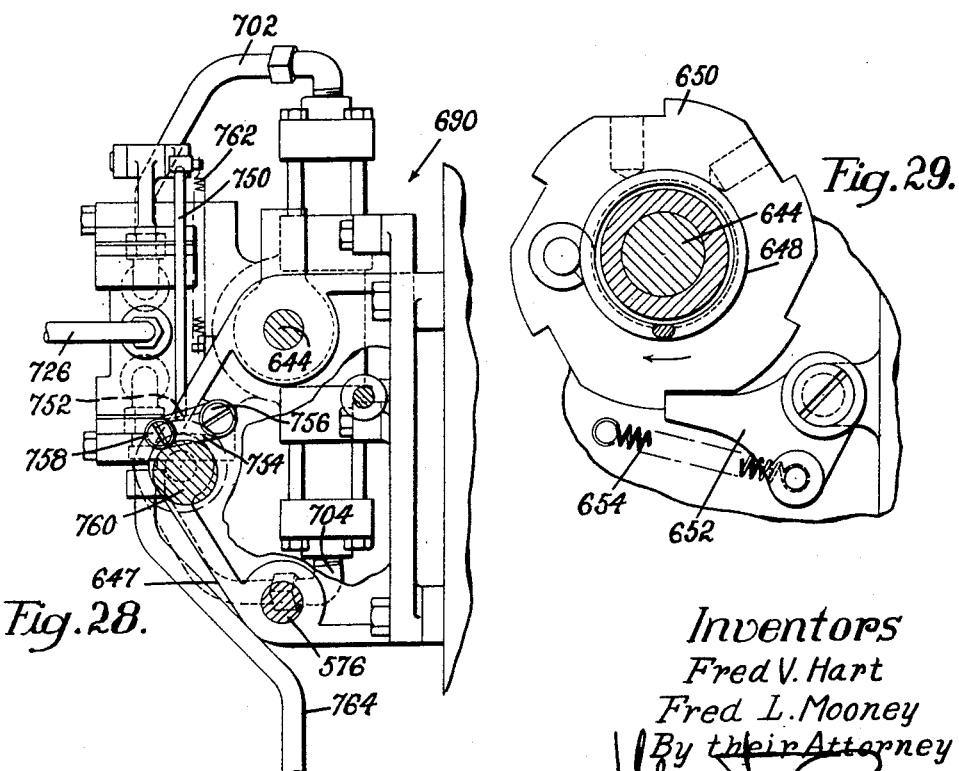
Inventors
Fred V. Hart
Fred L. Mooney
By their Attorney

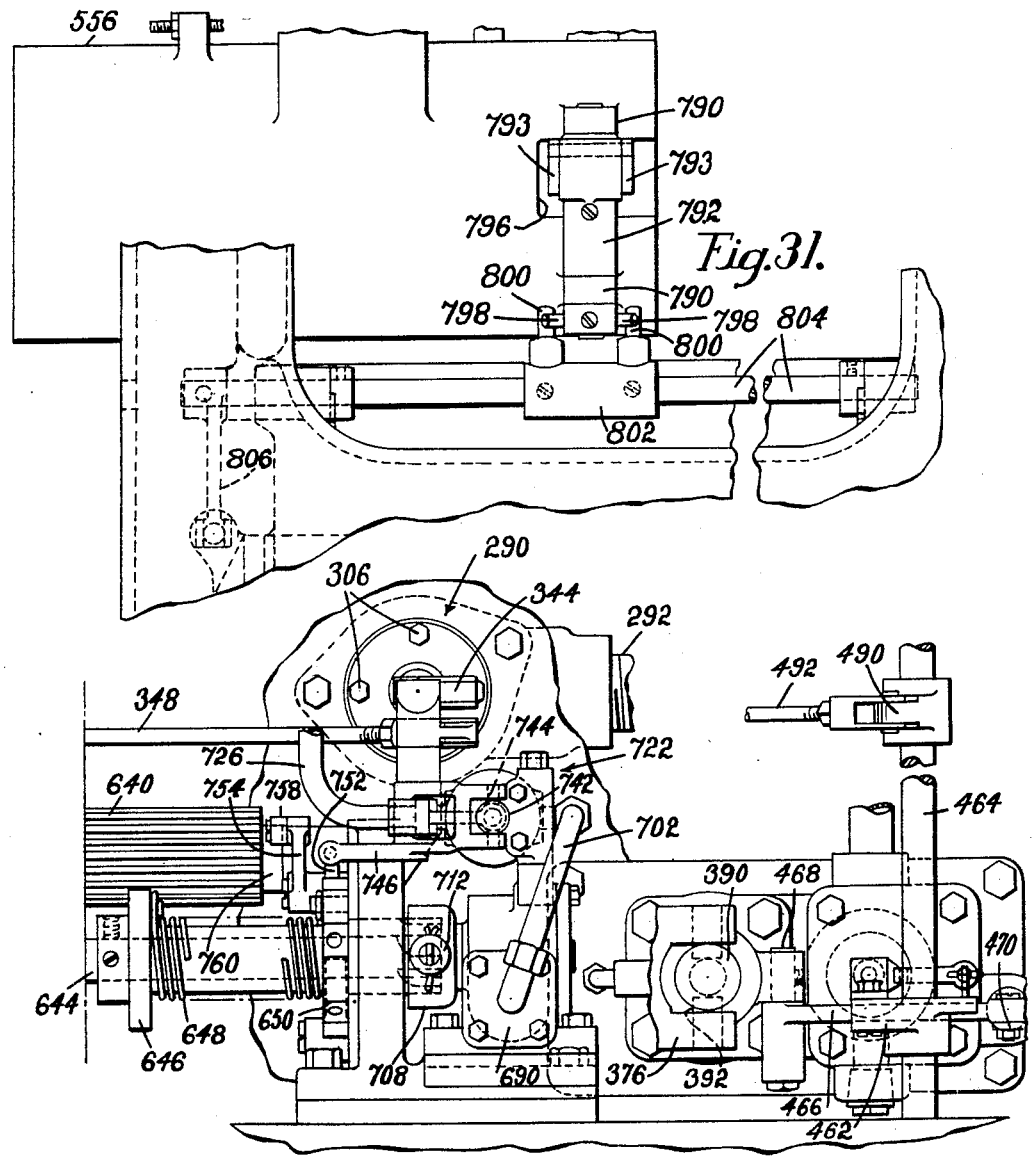

April 20, 1948.  F. V. HART ET AL  2,439,889
LEVELING MACHINE
Filed Dec. 5, 1945  26 Sheets-Sheet 19
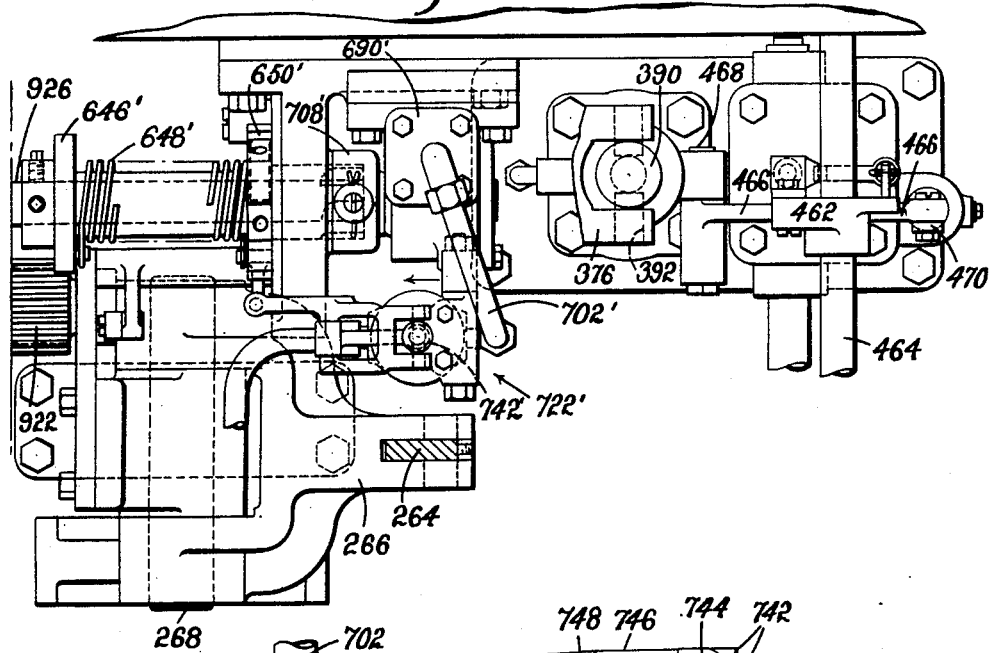
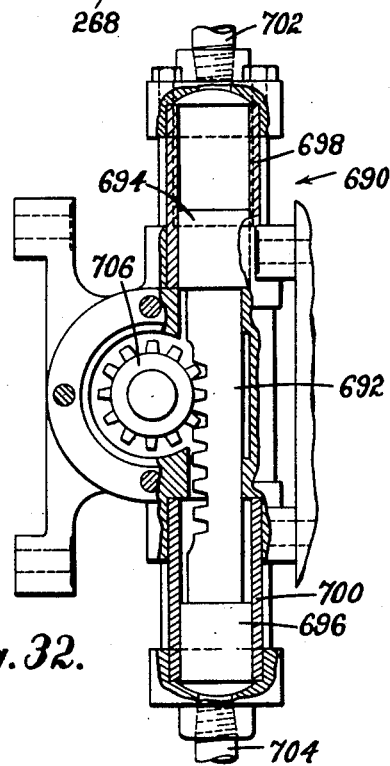
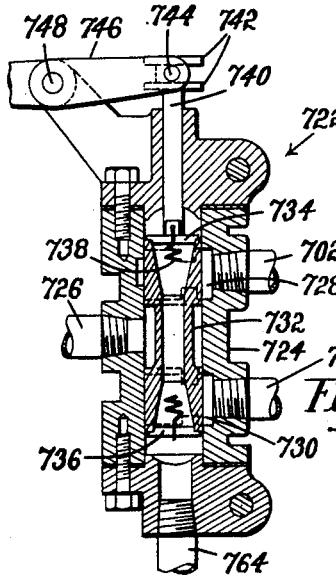
Inventors
Fred V. Hart
Fred L. Mooney
By their Attorney

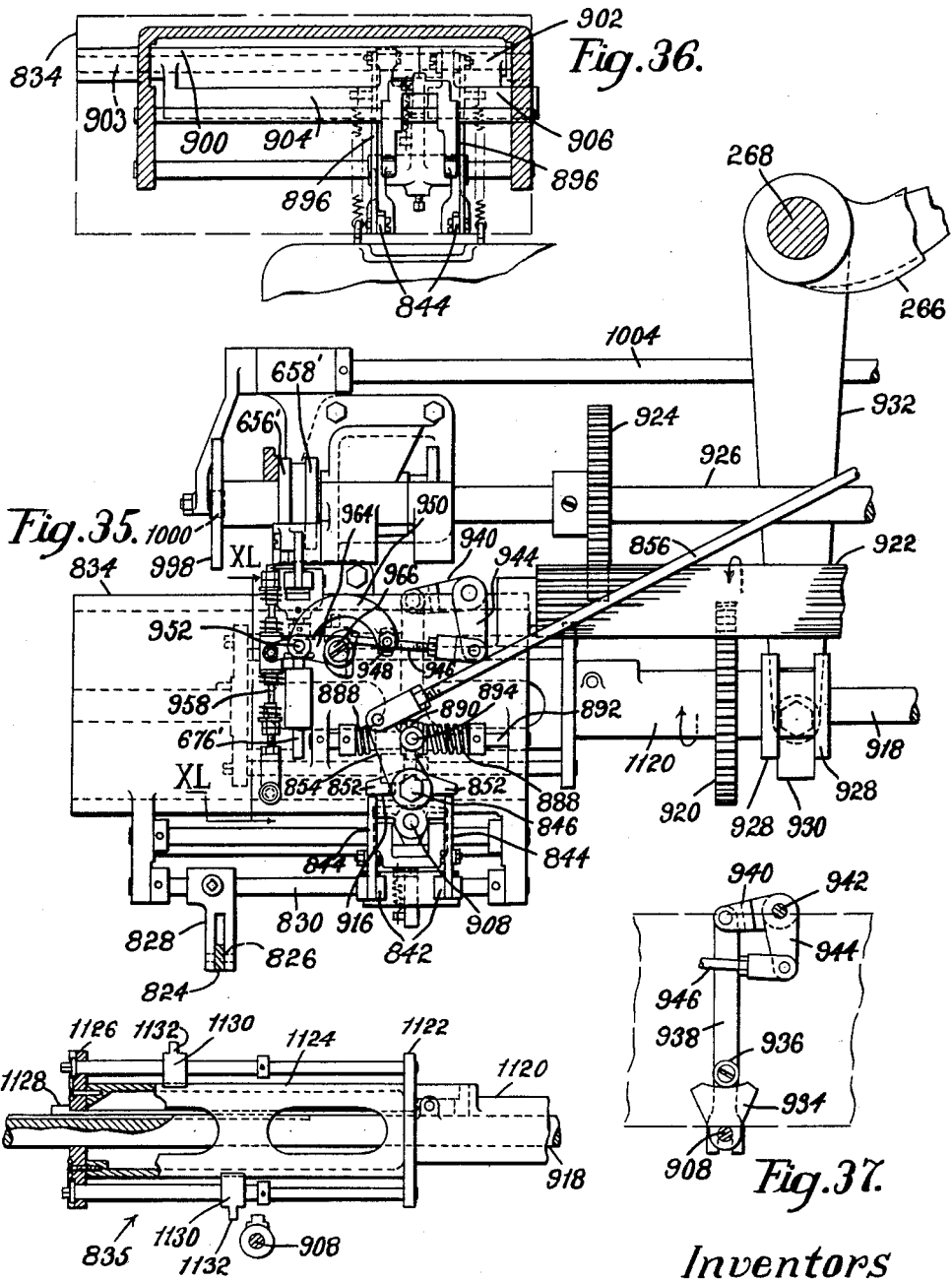

April 20, 1948.　　F. V. HART ET AL　　2,439,889
LEVELING MACHINE
Filed Dec. 5, 1945　　26 Sheets-Sheet 21
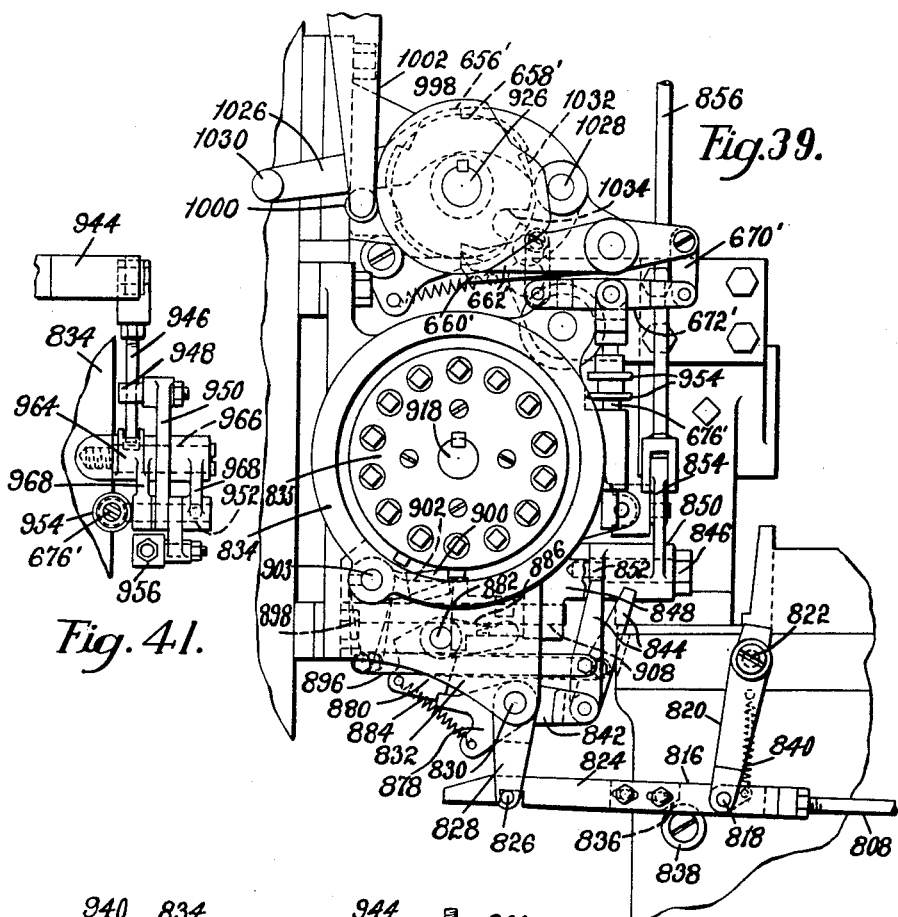
Fig. 39.
Fig. 41.
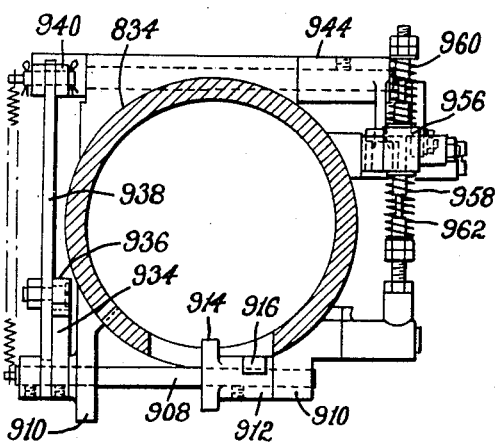
Fig. 40.
Inventors
Fred V. Hart
Fred L. Mooney
By their Attorney April 20, 1948.  F. V. HART ET AL  2,439,889
LEVELING MACHINE
Filed Dec. 5, 1945   26 Sheets-Sheet 22
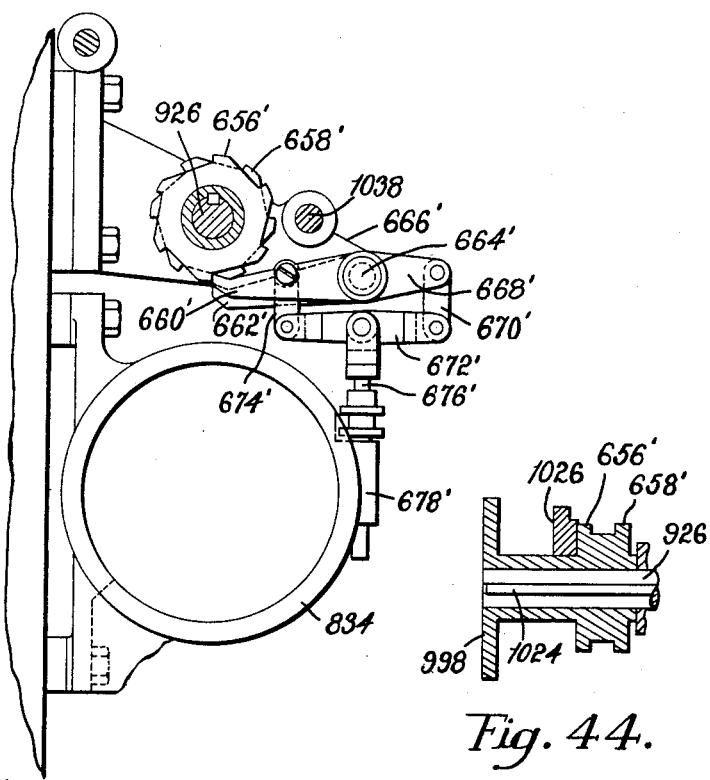
Fig. 42.
Fig. 44.
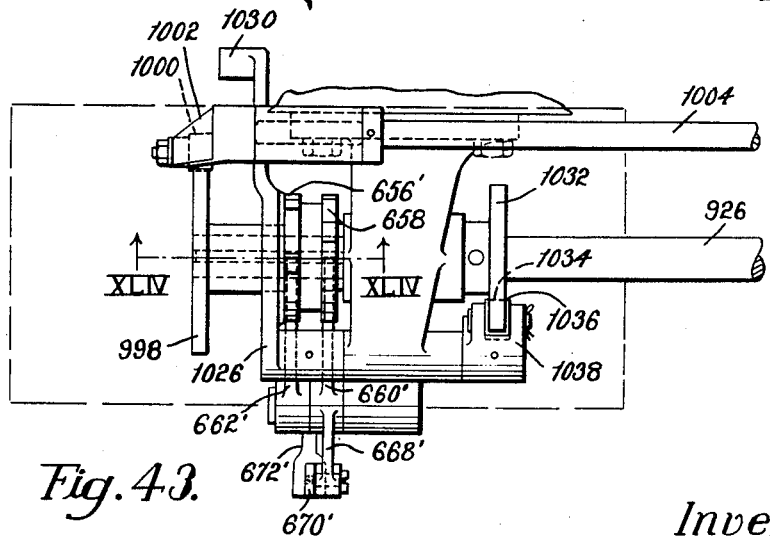
Fig. 43.
Inventors
Fred V. Hart
Fred L. Mooney
By their Attorney

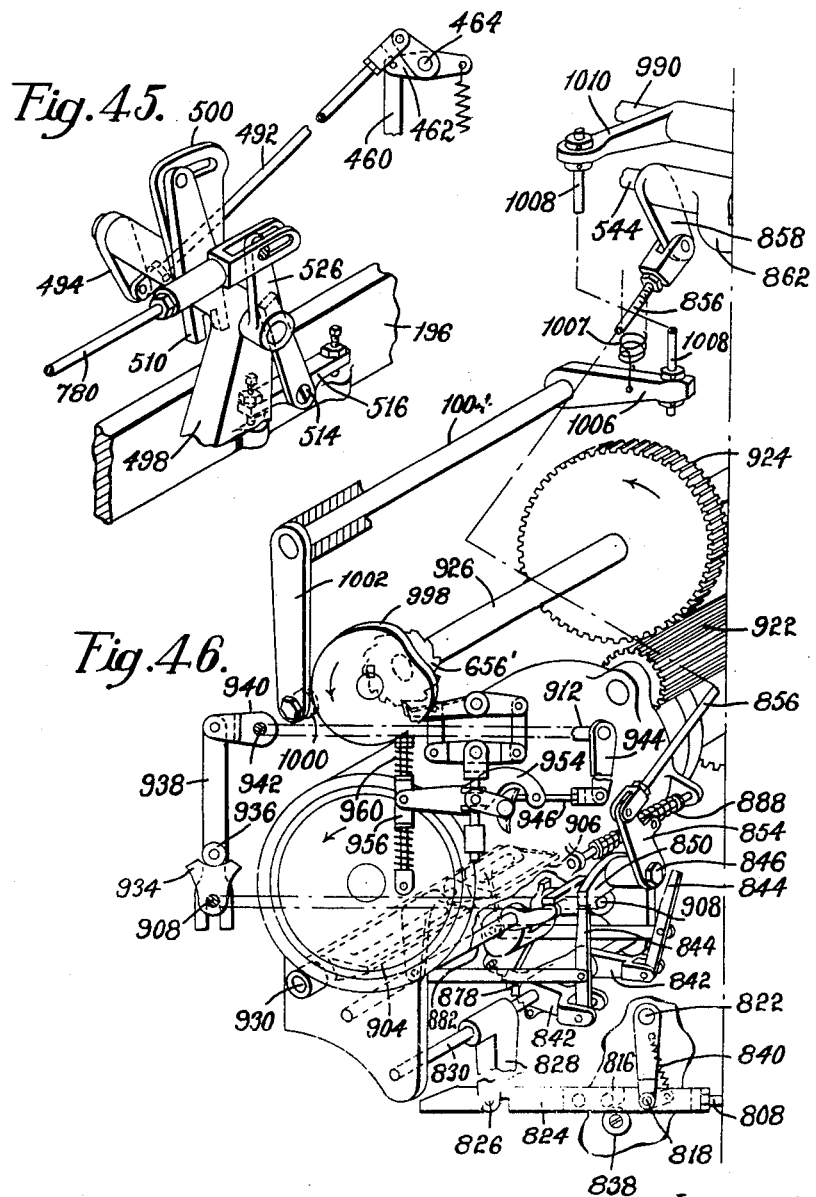

Inventors
Fred V. Hart
Fred L. Mooney
By their Attorney

April 20, 1948.    F. V. HART ET AL    2,439,889
LEVELING MACHINE
Filed Dec. 5, 1945    26 Sheets-Sheet 25
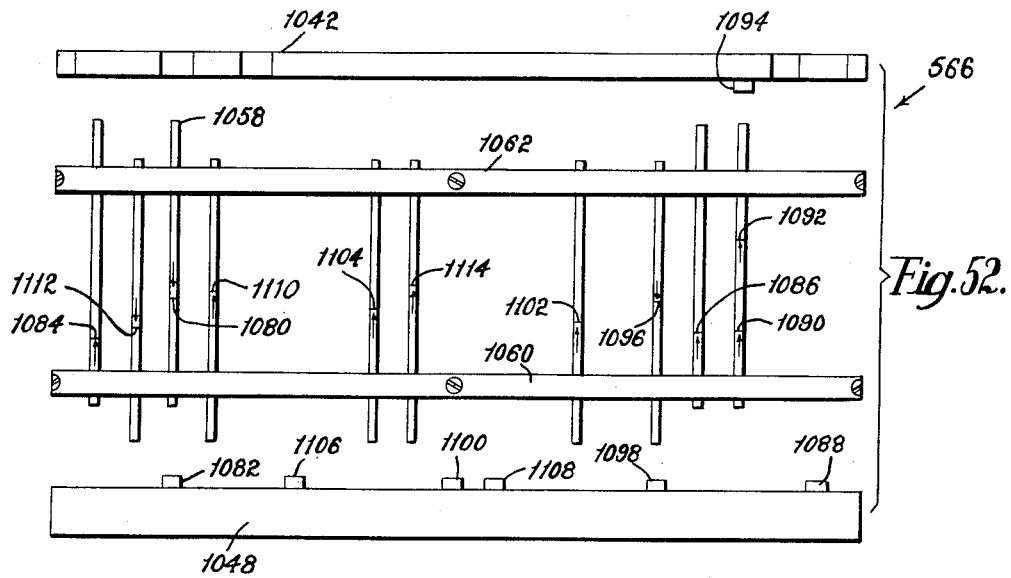
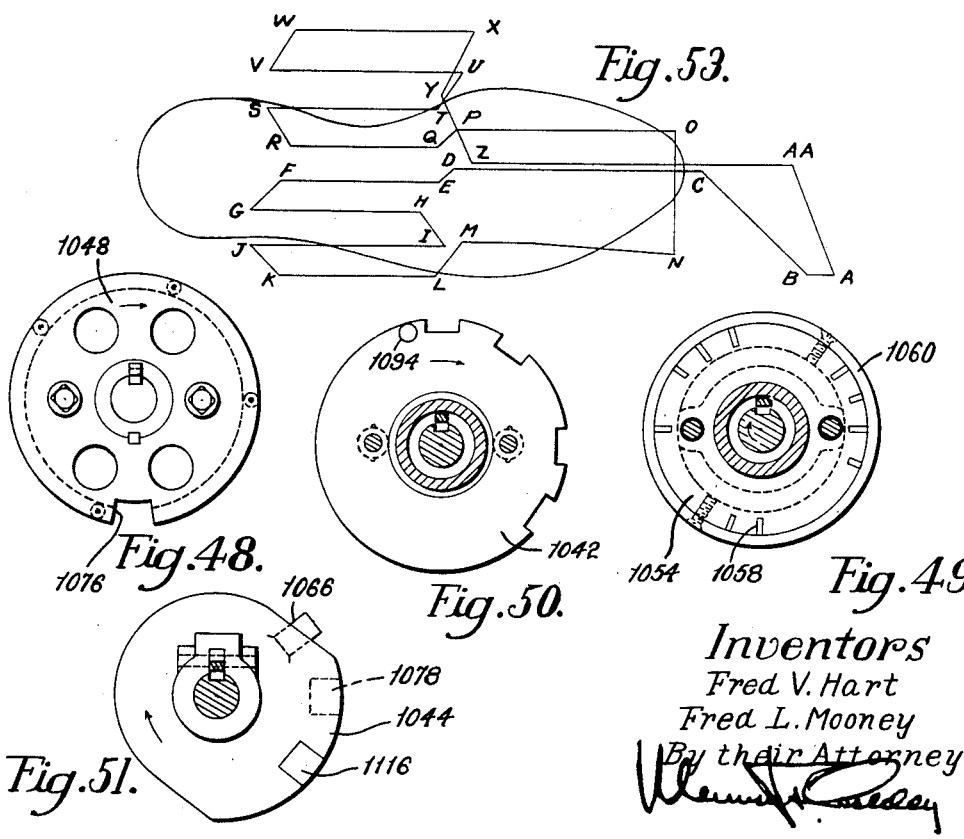
Inventors
Fred V. Hart
Fred L. Mooney
By their Attorney

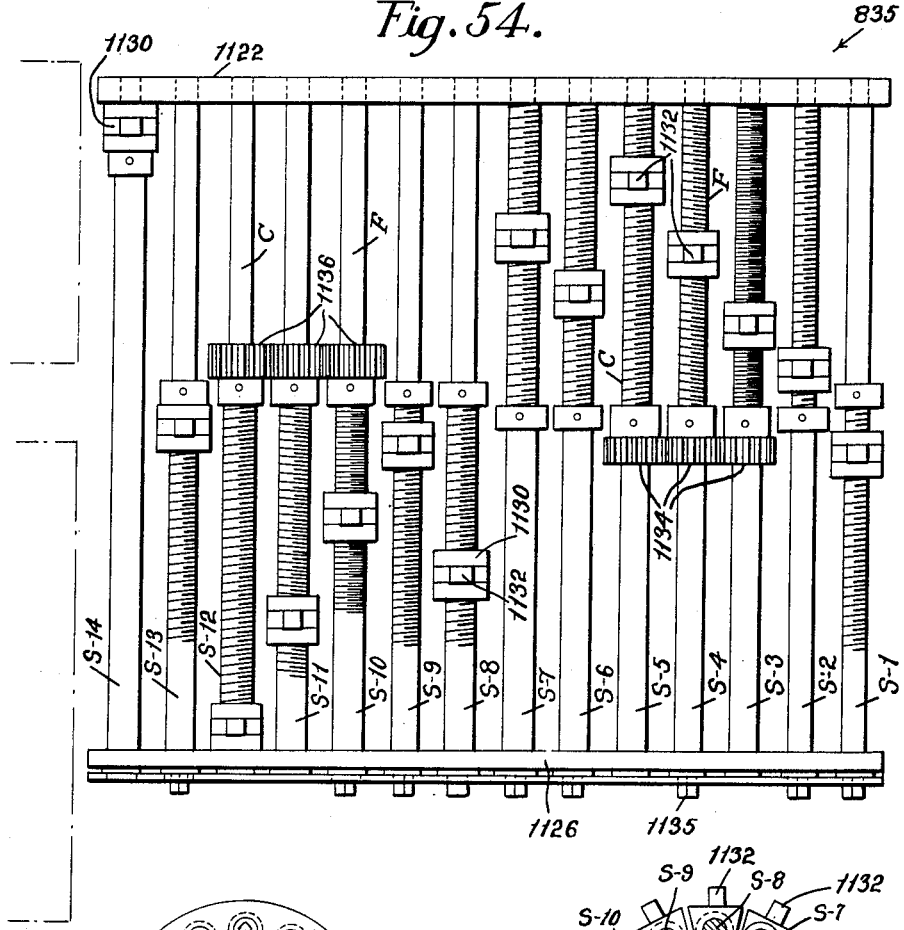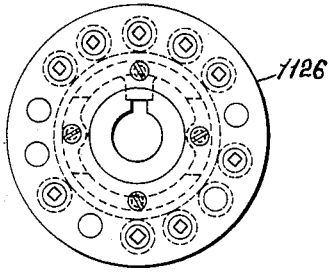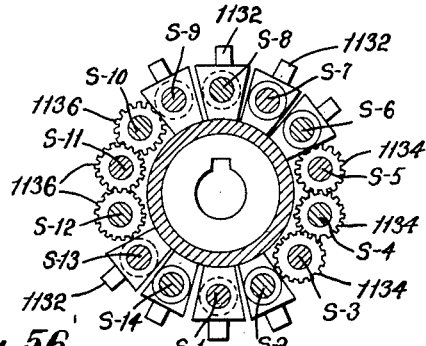

Patented Apr. 20, 1948

2,439,889

UNITED STATES PATENT OFFICE 2,439,889

LEVELING MACHINE

Fred V. Hart and Fred L. Mooney, Lynn, Mass., assignors to United Shoe Machinery Corporation, Flemington, N. J., a corporation of New Jersey Application December 5, 1945, Serial No. 632,932

46 Claims. (Cl. 12—34)

This invention relates to machines for operating on shoes, and more particularly to machines for shaping or leveling the bottoms of shoes. The invention is herein illustrated with reference to a leveling machine of the type shown in Letters Patent of the United States No. 2,322,334, granted June 22, 1943, on an application of E. E. Winkley, having a leveling tool, a shoe support and power-operated means for effecting relative movements of the tool and support in opposite directions lengthwise of a shoe on the support to cause the tool to operate progressively along the bottom of the shoe in accordance with a predetermined cycle. Such machines have provisions for pressing the leveling tool into engagement with the bottom of the shoe and for lifting the tool at predetermined points in its operation on the shoe bottom to relieve the pressure thereon. Provision is also made for tipping the leveling tool at definite points in the operation along the shoe bottom to vary its inclination relatively thereto. It is to be understood, however, that in its more general applications the invention is not limited to use in machines of the particular type illustrated.

An object of the invention is to provide improved automatically controlled power-operated means for causing relative movements of the leveling tool and shoe support to cause the tool to operate progressively along the shoe bottom and for lifting and tipping the leveling tool in accordance with a predetermined cycle of operations. In machines of this type the leveling tool and shoe support are located initially out of operative relation to each other, and in accordance with a feature of the invention automatic means are provided for first causing relative movements of the tool and support to cause the tool to engage the bottom of the shoe followed by a plurality of relative movements to cause the tool to engage different portions of the shoe bottom. Most specifically, the leveling tool is positioned when the machine is at rest out of engagement with a shoe on the support but in the path of movement thereof. Automatic means is provided for first lifting the leveling tool and moving the support to carry the shoe beneath the tool and subsequently imparting forward and rearward movements to the support with the tool in engagement with the shoe bottom to cause the machine to operate through a definite cycle.

In accordance with another feature of the invention, the shoe support and tool are located initially out of operative relation to each other, there being power-operated means for imparting to the support and tool first movements from their initial positions to cause the tool to engage the bottom of a shoe on the support followed by relative movements in opposite directions lengthwise of the shoe to cause the tool to operate progressively along the shoe bottom, and a member movable by the operator to start the power-operated means and automatic means for moving the member reversely to stop the power-operated means when the support and tool have been returned to their initial starting positions.

In accordance with another feature of the invention the shoe support is movable by mechanism arranged to be operated by pressure of fluid against it, the pressure of the operating fluid being increased sufficiently in response to the depression of a treadle to cause operation of the mechanism. The fluid pressure means is automatically controlled in a manner to cause a plurality of swinging movements of the shoe support of predetermined directions and extents.

For rocking or tipping the leveling tool relatively to the shoe support, fluid pressure means is provided which, in accordance with another feature of the invention, is automatically controlled in timed relation with the fluid pressure mechanism for swinging the shoe support so that the tipping movements take place at predetermined points in the operation of the tool on the shoe bottom, according to a predetermined schedule, the leveling operation being terminated after a predetermined number of swinging movements. The operation is terminated by decreasing the pressure of fluid to the fluid pressure means, there being means operable prior to the decrease in the pressure of fluid for causing a relative movement of separation of the tool and shoe support.

In accordance with a still further feature of the invention, the fluid pressure means for tipping the leveling roll is controlled by a valve operated automatically in a manner to obtain a predetermined cycle of operations, the means for controlling the valve being arranged to cause a continuous tipping movement laterally of the shoe to be imparted to the leveling tool in response to relative movement of the support and the tool in operating along a selected portion of the shoe bottom.

The invention is illustrated herein as applied to a twin leveling machine provided with a pair of shoe supports and a pair of leveling rolls so that a pair of shoes may be operated upon simultaneously by the machine. In accordance with a further feature of the invention the shoe supports are movable in unison lengthwise of the shoes thereon, each shoe support comprising a heel and toe support, there being a single means for simultaneously varying the distances between the heel support and the toe support of each shoe support and individual means associated with each heel support for moving the heel support to force the shoe firmly into engagement with the toe support. Other features are to be found in details of the shoe supports including the mounting of the toe support for adjustments about an axis extending laterally of the shoe and located at the toe-engaging surface of the support, there being means for automatically locking the toe support in its proper position of adjustment in response to swinging movement of the shoe support into cooperative relation to the leveling roll.

The above and other features of the invention, including various novel details of construction and combinations of parts, will now be more particularly described by reference to the accompanying drawings and pointed out in the claims.

In the drawings,

Fig. 1 is a right hand side elevation of the front part of one form of machine in which the invention is embodied;

Fig. 2 is a similar view of the rear portion of the machine;

Fig. 6 is a front elevation, partly in section, of the right side of the machine;

Fig. 7 is a plan view of the treadle assembly;

Fig. 8 is a front elevation, partly in section, of the shoe-supporting jacks;

Fig. 9 is a rear elevation of the rear right hand side of the machine looking rearwardly, certain parts being broken away and other parts being shown in section, this view being on a larger scale than Fig. 1;

Fig. 11 is a vertical longitudinal section through the motor and associated mechanism for effecting the swinging movements of the jacks;

Fig. 12 is a plan view of a portion of the mechanism shown in Fig. 11;

Fig. 13 is a vertical longitudinal section through the motor for tipping the leveling rolls;

Fig. 14 is a vertical transverse section through the motors shown in Figs. 12 and 13 illustrating some of the mechanisms associated therewith;

Fig. 15 is a vertical section through one of the roll-lifting motors and its control valve;

Fig. 16 is a vertical section through the pressure-regulating valve;

Fig. 17 is a section on the line XVII—XVII of Fig. 16;

Fig. 18 is a section on the line XVIII—XVIII of Fig. 16;

Fig. 19 is a section on the line XIX—XIX of Fig. 16;

Fig. 20 is a vertical section through the valve for controlling the operation of the jacks-swinging motor;

Fig. 24 is a front elevation partly in section of the latch mechanism associated with the control mechanism of Fig. 21;

Fig. 25 is a plan view of the mechanism shown in Fig. 24;

Fig. 26 is a plan view of the pawls shown in Figs. 24 and 25;

Fig. 27 is an elevation partly in section of the mechanism located rearwardly of that shown in Fig. 21, illustrating the motor for winding the torsion spring which indexes the control member of Fig. 21;

Fig. 28 is a front elevation of the motor of Fig. 27 and its control valve;

Fig. 29 is a front elevation partly in section showing the ratchet and holding pawl associated with the winding mechanism of Fig. 27;

Fig. 29A is a section on the line XXIXA—XXIXA of Fig. 27;

Fig. 30 is a plan view of the mechanism shown in Figs. 27 and 29 and associated mechanisms;

Fig. 31 is a side elevation of the jack-controlling member illustrating the mechanism by which the times of the roll-tipping movements are controlled;

Fig. 32 is a vertical section through the motor of Fig. 27;

Fig. 33 is a vertical section through the valve of Fig. 28;

Fig. 34 is a plan view similar to Fig. 30 of the mechanism associated with the roll-tipping control structure;

Fig. 35 is a side elevation of the mechanism for controlling the operation of the roll-tipping motors;

Fig. 36 is a plan view partly in section of a portion of the mechanism shown in Fig. 35;

Fig. 37 is a side elevation of a portion of the mechanism for initiating indexing of the control unit;

Fig. 38 is a side elevation partly in section of the control unit associated with the roll-tipping mechanism;

Fig. 39 is a front elevation of the mechanism shown in Fig. 35;

Fig. 40 is a vertical section on the line XL—XL of Fig. 35;

Fig. 41 is a side elevation of a portion of the mechanism of Fig. 39;

Fig. 42 is a front elevation partly in section showing the ratchet and pawl mechanism for controlling the operation of the rolls-tipping control mechanism;

Fig. 43 is a plan view of the mechanism of Fig. 42;

Fig. 44 is a section on the line XLIV—XLIV of Fig. 43;

Fig. 45 is a perspective of a portion of the mechanism associated with the jacks-tipping motor;

Fig. 46 is a perspective view of the control mechanism and associated structure in the left side of the machine;

Fig. 48 is a view of the front end of the control unit associated with the jacking mechanism;

Fig. 49 is a section through the control unit near the front portion thereof;

Fig. 50 is a similar view through the control unit taken rearwardly of the section of Fig. 49;

Fig. 51 is a front elevation of a disk associated with the control unit and located rearwardly of it;

Fig. 52 is a view illustrating the appearance of the jack control unit if such were rolled out onto a plane surface;

Fig. 53 is a view illustrating diagrammatically the directions and extents of the swinging movements of the jacks and the tipping movements of the leveling rolls through one complete cycle of operations;

Fig. 54 is a view similar to Fig. 52 of the roll-tipping control unit of Fig. 38;

Fig. 55 is a front elevation of the control unit of Fig. 38, and

Fig. 56 is a vertical transverse section through the control unit of Fig. 38.

Figure 3:
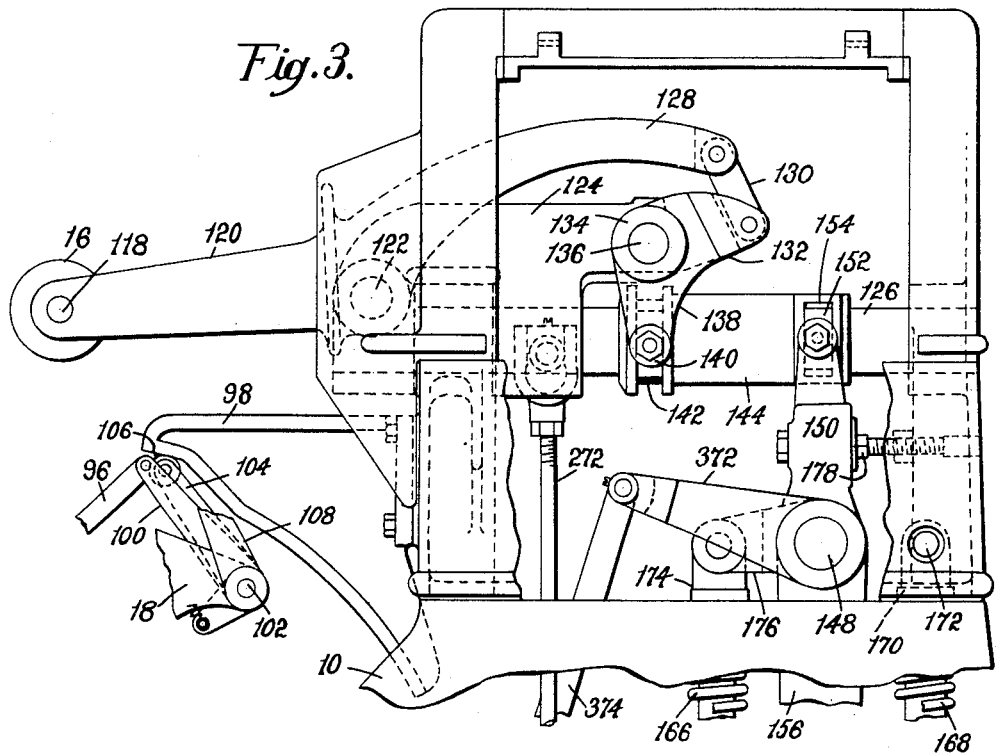
Fig. 3 is a side elevation of the head of the machine illustrating the leveling roll.

The machine includes a main frame 10 in which is journaled a transversely extending shaft 12 (Figs. 1, 6 and 8). The shaft 12 carries a pair of shoe supporting jacks 14 in side-by-side relation. Each of these jacks supports a shoe in inverted position to be operated upon by a leveling roll 16 (Fig. 3) in response to movements of the jacks in directions lengthwise of the shoes, there being mechanism to be described for automatically moving the jacks in unison to carry the shoes rearwardly and forwardly beneath the rolls and mechanism for imparting tipping movements to the rolls in accordance with a predetermined cycle of operations.

Each of the jacks 14 comprises a toe post 18 and a heel post 20. The toe posts are secured by screws 21 (Fig. 8) to the shaft 12. Between the toe posts 18 is an upwardly extending arm 22 of a lever 24 journaled on the shaft 12, the upper end of the arm 22 being bifurcated and connected to the upper ends of the toe posts by a rod 26 Fig. 8) and nuts 28 threaded onto the end of the rod. The heel posts 20 are journaled on the shaft 12 and have bearing portions 30, 32 located at opposite sides of the toe posts 18. Arms 34 integral with the heel posts extend upwardly therebetween and are connected at their upper ends by a pin 36 and a trunnion block 38 between the adjacent upper ends of the arms 34. The positions of the toe posts with respect to the heel posts are controlled by a screw 40 the ends of which are oppositely threaded and pass through threaded bores in the trunnion block 38 and a trunnion block 44 carried by the rod 26. A hand wheel 46 is carried by the forward end of the screw 40 and by turning this wheel it will be understood that the heel posts 20 will be moved in unison relatively to the toe posts 18 to vary the size adjustments of the jacks thereby to accommodate shoes of different lengths and thus to enable positioning the ends of the toes of shoes of different sizes in substantially the same locations. A spring 48, connected at one end to the arm 22 of lever 24 and at the other end to a pin 50 (Fig. 8) carried between the arms 34 of the heel posts, acts to counterbalance the weight of the heel posts thereby facilitating their adjustment.

The toe and heel posts are provided with means for supporting a last and shoe for the leveling operation. Adjustably carried by the toe posts 18 are adjustable toe supports 52 having flanges received in curved slots in plates 54 secured to the upper end of each toe post so that each toe support 52 may adjust itself to the shoe thereon about an axis extending laterally of the shoe and located substantially at the shoe engaging face of the support. Provision is also made for adjusting the toe supports heightwise of the toe posts as disclosed in United States Letters Patent No. 1,962,141, granted June 12, 1934, upon an application of Andrew Eppler. The heel support for each jack comprises a heel spindle 56 carried by a block 58 pivoted at 60 to the top of the heel post 20 to swing in directions lengthwise of the shoe. This block is connected by an adjustable link 62 to one end of a spring 64 the other end of which is connected to the frame of the machine. The spring tends to move the block in a clockwise direction thereby to urge the spindle 56 toward the toe support. In placing a shoe on the jack the block 58 is rocked in a counterclockwise direction by the operator sufficiently to permit the toe end of the shoe to rest on the support 52. The cone of the last is engaged by a cone support in the form of a rubber roll 66 carried by a slide 68 which is mounted for movements in directions heightwise of the shoe in a boss 70 on the toe post and is upheld by spring means (not shown) with the roll 66 in position to be engaged by a last and shoe and to be depressed against the resistance of said spring means as the last and shoe are forced firmly against the toe support 52. The mounting of the slide 68 is similar to that illustrated and described in Letters Patent of the United States No. 2,104,739, granted January 11, 1938, on an application filed in the names of Andrew Eppler et al.

Provision is made for moving the block 58 in a clockwise direction after the shoe has been placed on the jack thereby to hold the toe end of the shoe firmly in engagement with the toe support 52, the spring 64 not being strong enough to hold the toe end of the shoe against the support with the required force. The link 62 carries a pin 72 in its lower end for engagement by a pair of arms 74 pivoted at 76 to opposite sides of the heel post 20, the arms 74 being held in engagement with the pin 72 by a spring 78 extending between the frame of the machine and a downwardly extending arm 80 secured to one of the arms 74. Extending forwardly from each heel post 20 is a bracket 82 carrying an upwardly extending curved bar 84 provided on its front surface with ratchet teeth 86 arranged to hold an arm 88 in the correct position of adjustment. These arms 88 are bifurcated and extend rearwardly at opposite sides of the heel posts and are secured at their rearward ends to blocks 90 (Fig. 8) received in curved slots 92 in the opposite sides of the toe post 18. The arms 88 carry rolls 93 arranged to engage arms 94 which are secured to the arms 74 and extend upwardly and rearwardly so that as the arms 88 are moved downwardly the rolls 93 act on the arms 94 and through the pins 72 in the links 62 to move the spindles 56 rearwardly thereby forcing the toe ends of the shoes firmly against the toe supports 52. The slots 92 supporting the blocks 90 in which the arms 88 are journaled are concentric with the axis of the shaft 12 so that adjustments of the heel posts with respect to the toe posts are permitted.

Figure 4:
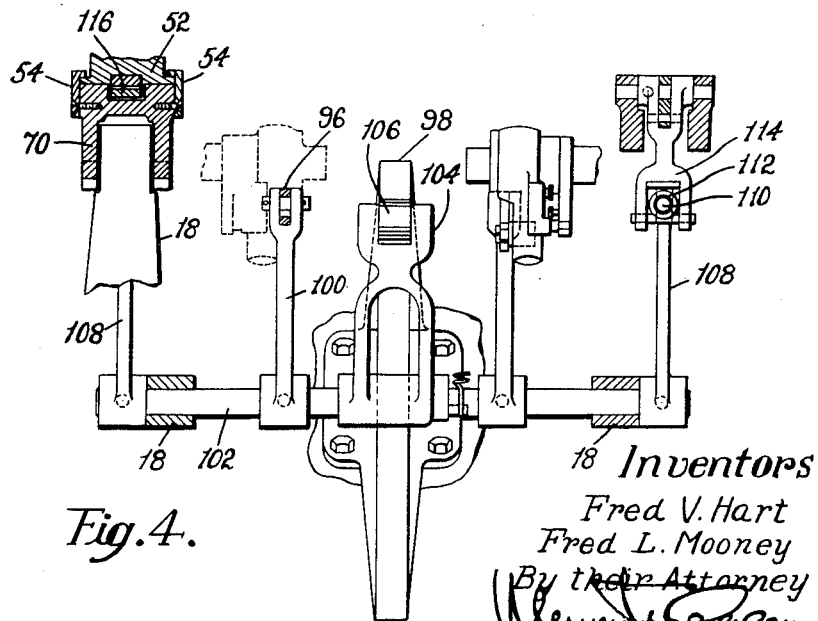
Fig. 4 is a section on the line IV—IV of Fig. 1.
Figure 5:
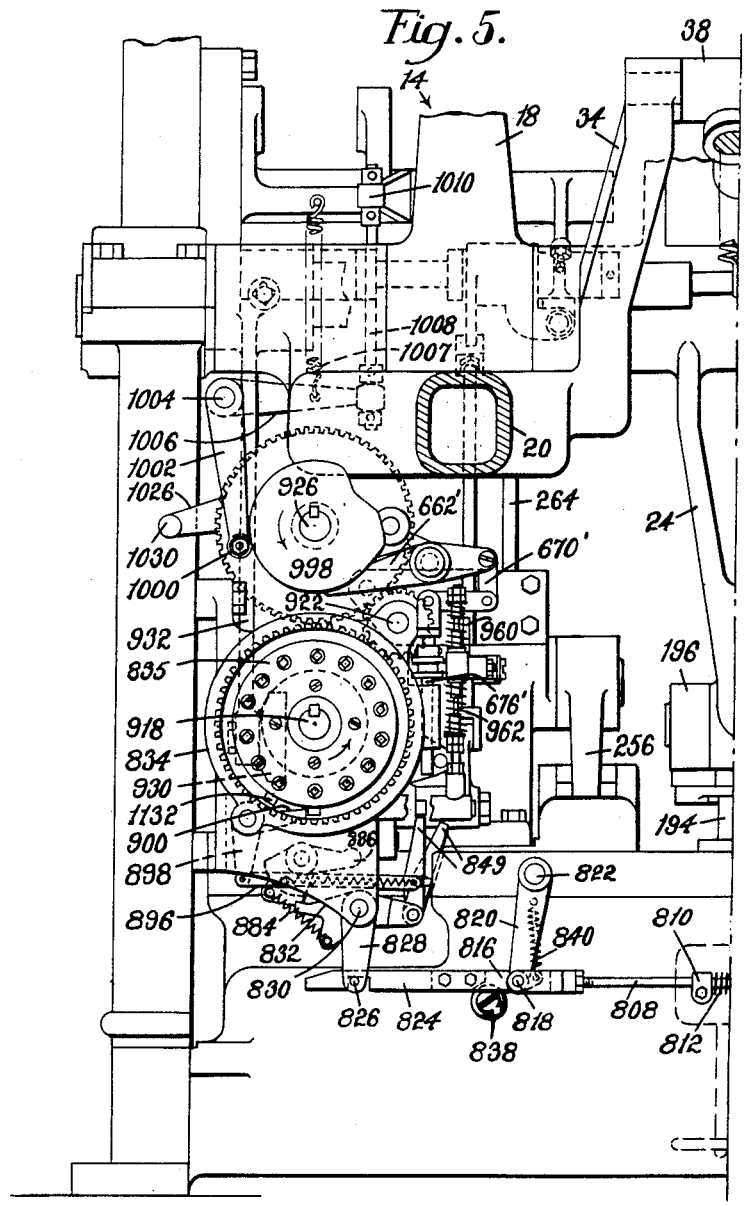
Fig. 5 is a front elevation, partly in section, of the left side of the machine.

For locking each cone supporting slide 68 in accordance with the above-identified Patent No. 2,104,739, as well as for forcing it more firmly against the shoe prior to the leveling operation, an arm 96, corresponding to an arm 142 of Letters Patent of the United States No. 2,230,244 granted February 4, 1941, on an application filed in the names of Fred V. Hart et al., is operated by a fixed cam 98 carried by the frame of the machine. For this purpose the rearward end of each arm 96 is connected by an arm 100 (Figs. 3 and 4)

to a shaft 102 carried by the toe post 18. This shaft also carries an arm 104, the upper end of which is provided with a cam roll 106, arranged to engage the cam surface of the cam 98. The cam surface is so shaped, as shown most clearly in Figs. 1 and 3, that as the jack starts to move rearwardly in the leveling operation the arm 104 will move in a counterclockwise direction causing similar movement to the arm 100 associated with each jack, thereby moving the arms 96 forwardly to urge the rolls 66 on the slides 68 more firmly into engagement with the shoes and locking the slides against downward movement during the leveling operation. Except for its upper portion this cam surface is concentric with the axis of the shaft 12 so that the only movement imparted by the cam roll 106 to the shaft 102 occurs at the beginning of the movement of the jacks and before the shoes are moved into engagement with the leveling rolls.

The toe support 52 is also locked in the position to which it has been moved in the jacking operation, by the cam roll 106. The shaft 102 carries a pair of upwardly extending arms 108, there being one associated with each jack, the upper ends of these arms being connected by links 110 and springs 112 to the lower ends of bell crank levers 114 pivoted to the upper rearward portions of the toe supports. The bell crank levers include forwardly extending arms 116 provided with teeth engageable with teeth in the under surfaces of the toe supports 52 so that upon counterclockwise movement of the arms 108 these arms act through the springs 112 to move the arms 116 of the bell crank levers into locking engagement with the toe supports 52.

Each leveling roll 16 (Fig. 3) is mounted for turning movement on a rod 118 in a holder 120 which is pivotally connected at 122 to a carrier 124. The carrier is mounted for tipping movements laterally of the machine about the axis of a forwardly and rearwardly extending shaft 126 supported in bearings at the top of the frame 10. The holder 120 has a rearwardly extending arm 128 connected by a short link 130 to the rearwardly extending arm 132 of a bell crank lever 134 fulcrumed at 136 to the carrier 124. The bell crank lever 134 has a pair of downwardly extending arms 138 carrying trunnions 140 extending into a circumferential groove 142 formed in a bushing 144 that is slidably mounted on the shaft 126. Pivotally mounted on each of a pair of laterally extending shafts 148 supported by suitable bearings in the frame 10 at opposite sides of the machine is an upwardly extending arm 150 (Figs. 2 and 3) the upper portion of which is forked to straddle the bushing 144, the arms of the forked portion carrying blocks 152 extending into a circumferentially-extending recess 154 in the bushing 144. Mounted on each shaft 148 is a downwardly extending yoke member 156 and connected to this member is a yoke-shaped member 158 (Fig. 2) between the arms of which at their lower ends there is pivoted a lever 160. This lever has oppositely extending arms of equal lengths to the ends of which are pivotally connected abutments 162, 164 for relatively heavy expansion springs 166, 168. At its upper end each spring 168 bears against an abutment 170 pivoted at 172 to the frame 10. Each spring 166 at its upper end engages an abutment 174 pivotally connected to an arm 176 integral with the arm 150. It will be evident that the springs 166, 168 tend to swing the arms 176, 150 in a clockwise direction as viewed in Figs. 2 and 3 to move the bushings 144 rearwardly on the shafts 126 thereby to impart downward swinging movements to the holders 120 to lower the leveling rolls 16. The initial position of each roll is determined by engagement of the arm 150 with an adjustable stop screw 178 threaded in the frame 10.

For imparting swinging movements to the jacks to carry the shoes forwardly and rearwardly beneath the leveling rolls, there is provided a fluid-pressure-operated mechanism illustrated in Figs. 11 and 14. This mechanism includes a rack 180 carrying at its opposite ends pistons 182, 184 movable in cylinders 186, 188 respectively which are supported in a fluid reservoir 190 in the lower part of the frame of the machine. A pinion 192 meshes with the teeth of the rack 180 and transmits motion to a rack 194 upon movement of the rack 180 in response to the introduction of pressure fluid into one or the other of the cylinders 186, 188. The rack 194 is slidable between guides formed in the top of the reservoir 190 and is connected by a link 196 to the lower end of lever 24, the upper end of which is connected to the jacks as heretofore described.

Pressure fluid is introduced into the ends of the cylinders 186, 188 through pipes 198, 200 respectively, the pipes being connected at their opposite ends to the casing of a valve 202 (Figs. 2 and 20) in which there is valve mechanism automatically operated by mechanism to be described to control the flow of fluid to and from either one of the cylinders 186, 188 and thus to control the direction of swinging movements of the jacks. The casing of valve 202 is provided with ports 204, 206 (Fig. 20) communicating with the pipes 198 and 200 respectively and intermediate these ports with a third port 208 communicating with a pipe 210 through which pressure fluid is supplied by a pump. The casing is bored to receive a sleeve 212 and is closed at its lower end by a cap 214 secured by screws 216 to the casing and at its upper end by a cap 218 secured by screws 220 to the casing, the caps 214 and 218 having circular projections thereon fitting the bore in the casing and engaging the top and the bottom faces of the sleeve 212. The sleeve 212 is provided with ports 222, 224 opposite the ports 204, 206 in the casing and with a port 226 opposite the port 208, the ports in the sleeve 212 each comprising an annular groove and holes connecting each annular groove with the interior of the sleeve. Fitted to slide within the sleeve 212 is a hollow valve member 230 having formed on its opposite end portions, flanges which are arranged, in certain positions of the valve member, to close the ports 222, 224 in the sleeve and having its intermediate portion reduced in thickness to form with the sleeve 212 an annular chamber 232 communicating through the ports 226 and 208 with the delivery pipe 210.

With the valve member 230 in the position shown, pressure fluid passes from the delivery pipe 210 into the pipe 198 and into the end of the cylinder 186 (Fig. 11) thereby to move the rack 180 to the right providing the operating fluid is under sufficient pressure. Accordingly, the jacks are moved rearwardly to carry the shoes into operative relation to the leveling rolls and will continue to move rearwardly as long as the valve member 230 is in the position shown in Fig. 20. The fluid in the cylinder 188 at this time exhausts through the pipe 200 and through a pipe 234 (Fig. 20) back to the reservoir. Upon movement of the valve member 230 downwardly, just enough to close the ports 222 and 224, the jacks will come to rest but if the valve is moved further downwardly again to uncover the ports 222 and 224, pressure fluid will flow from the delivery pipe 210 through the pipe 200 thereby to admit fluid into the outer end of the cylinder 188, causing a reversal in the direction of movements of the jacks. The fluid in the cylinder 186 exhausts through the pipe 198 and through the interior of the valve member 230 to the exhaust pipe 234.

The cap 218 is bored to receive a valve stem 236, the lower end of which is held in engagement with a cross bar 238 by a spring 240. The spring 240, which at its upper end is connected to the stem 236, extends downwardly through the hollow valve member 230 and is connected at its lower end to a similar cross bar 242, the bars 238, 242 engaging respectively the top and bottom faces of the valve member 230. The valve member 230 receives motion from the stem 236 which is operated automatically by mechanism to be explained in detail as the description proceeds.

For imparting to the rolls their tipping movements during the leveling operation, a fluid-pressure-operated mechanism shown in Figs. 13 and 14 is provided. This mechanism includes a rack 244, carrying at its outer ends pistons 246, 248 movable in cylinders 250, 252, supported in the fluid reservoir 190 adjacent to the fluid pressure mechanism for imparting swinging movements to the jacks. A pinion 254 engageable with the teeth of the rack 244 is engageable with a toothed segment 256 journaled on a shaft 258 supported by and extending outwardly from a bracket 260 secured to the top of the reservoir 190. The segment 256 includes a rearwardly extending bifurcated arm 262 between the bifurcations of which is pivoted a link 264, the upper end of which is pivoted to an arm 266 secured to a shaft 268 journaled in the frame of the machine. To the shaft 268 (Figs. 2, 13 and 14) are secured rearwardly extending arms 270 which are connected by adjustable links 272 to laterally extending arms 274 (Fig. 14) on the roll carriers 124. The arms 274 extend inwardly toward each other as shown in Fig. 14 so that the leveling rolls will tip in opposite directions in response to rotary movements imparted to the shaft 268. This arrangement is made because it is intended that a right and a left shoe will be operated upon simultaneously by the machine so that the leveling rolls will tip simultaneously either toward the outsides of the shoes or toward the insides of the shoes. The outer ends of the cylinders 250, 252 are connected by pipes 276, 278 (Figs. 2 and 13) to the top and bottom respectively of the casing of a valve 280 housing a valve element similar to that shown in Fig. 20 and described above.

Figure 10:
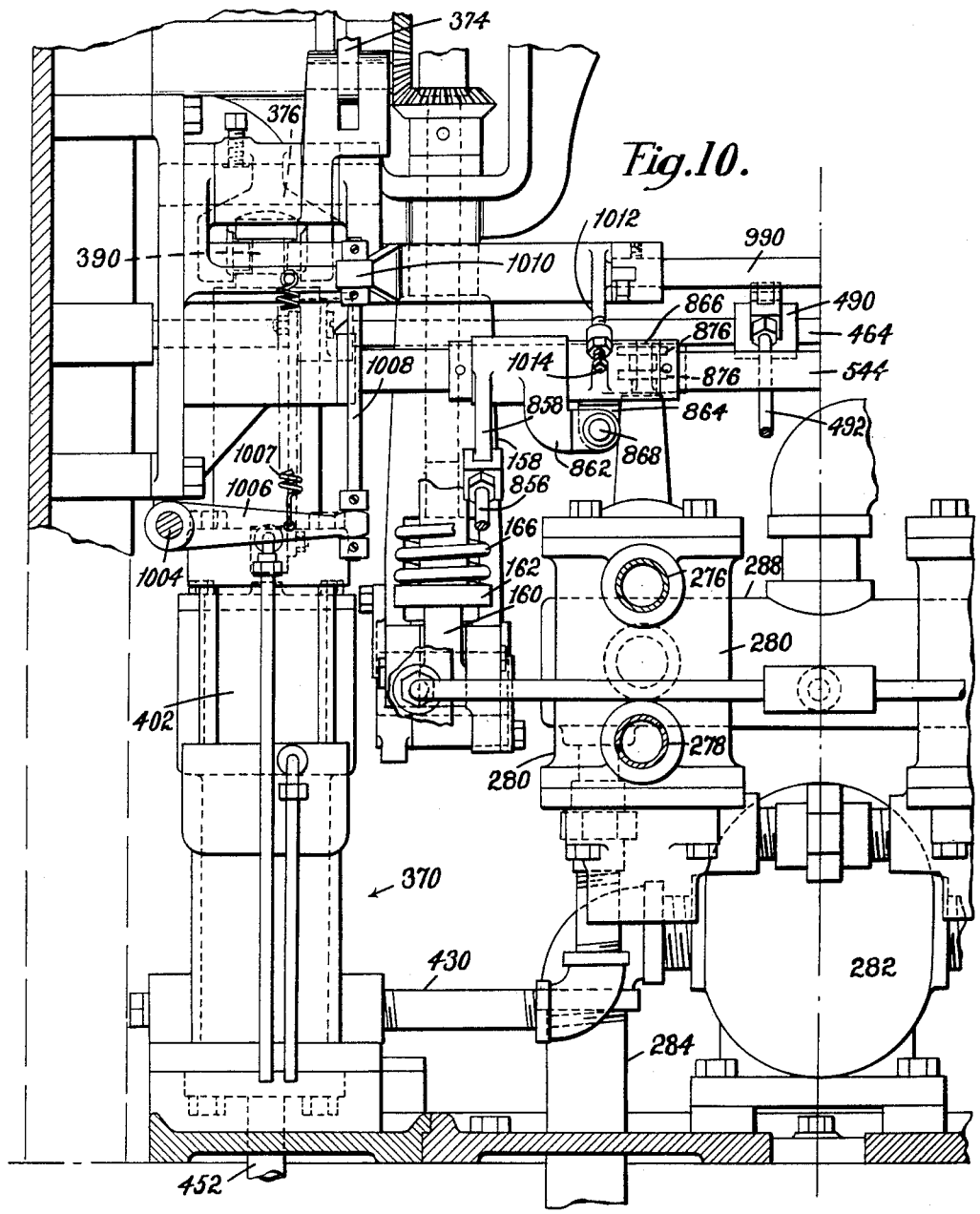
Fig. 10 is a view similar to Fig. 9 of the left side of the machine.

Pressure fluid is delivered from the reservoir 190 by a pump 282 (Figs. 9 and 10) supported on the top of the reservoir and having an intake pipe 284 communicating with the interior of the reservoir. The outlet of the pump is connected by a pipe 286 to a manifold 288 which is connected to the pipe 210 (Fig. 20) leading to the valve 202 and to a similar pipe leading to the valve 280 which controls the tipping movements of the leveling rolls. For controlling the pressure of fluid delivered by the pump 282, a pressure regulating valve 290 (Fig. 16) is connected to the discharge side of the pump by a pipe 292. With the machine at rest at the end of a cycle of operations the pressure regulating valve is set so that the pressure delivered by the pump to the valve 202 is insufficient to cause any movement of the jacks. The valve 290 comprises valve elements 294, 296 that are fitted to slide in bushings 298, 300 in the valve casing. The lower end of the casing is partially closed by a plate 302 and above the bushing 298 there is mounted in the casing a sleeve 304, the lower end of which engages the bushing 298 and the upper end of which is flanged to overlie the top face of the casing. Screws 306 hold the sleeve against endwise movement in the casing. Fitted to slide in the sleeve 304 is a plunger 308 provided with a central opening for a rod 310 that extends downwardly and is threaded into the valve member 294. The valve member 294 is counterbored to receive a spring 312 that surrounds the rod 310 and bears at its upper end against a shoulder 314 on the plunger 308. The valve casing is provided with ports 316, 318 that communicate respectively with the delivery pipe 292 and a passageway 320 which directs fluid back to the reservoir.

As shown, the valve elements 294 and 296 are of different diameters, the element 294 being fitted to slide in the bushing 298 and the smaller element 296 being fitted to slide in the bushing 300. There is formed around the body portion of the valve by the bushings 298, 300, and the valve casing, an annular chamber 322 that communicates with ports 324 in the bushings. The valve element 296 is provided with a plurality of ports or notches 326 and extending downwardly from the element 296 is a stem 328 on the lower end of which is formed a circular flange or disk 330 fitted to slide in the bushing 300. The disk 330 has its bottom face concave and formed in the plate 302 is a small central opening 332. The spring 312 tends to move the valve downwardly to carry the disk 330 toward the plate 302 but is arranged to yield in response to the pressure of the fluid on a shoulder 334 on the valve to permit upward movement of the valve above the position shown in Fig. 16 in which ports 336 in the bushing 298 and the port 318 in the valve casing permit escape of the excess fluid into the reservoir, the fluid also being permitted to escape through ports 338 in the bushing 300 and ports 340 in the valve casing. The action of the fluid on the disk 330 tends to retard the movements of the valve in opposite directions to prevent objectional vibrations of the valve. With the machine in operation the tension of the spring 312 is such that the fluid in the pipe 292 and the manifold 288 (Figs. 9 and 10) is maintained under sufficient pressure to operate the previously described motors for imparting swinging movements to the jack and tipping movements to the rolls.

Figure 21:
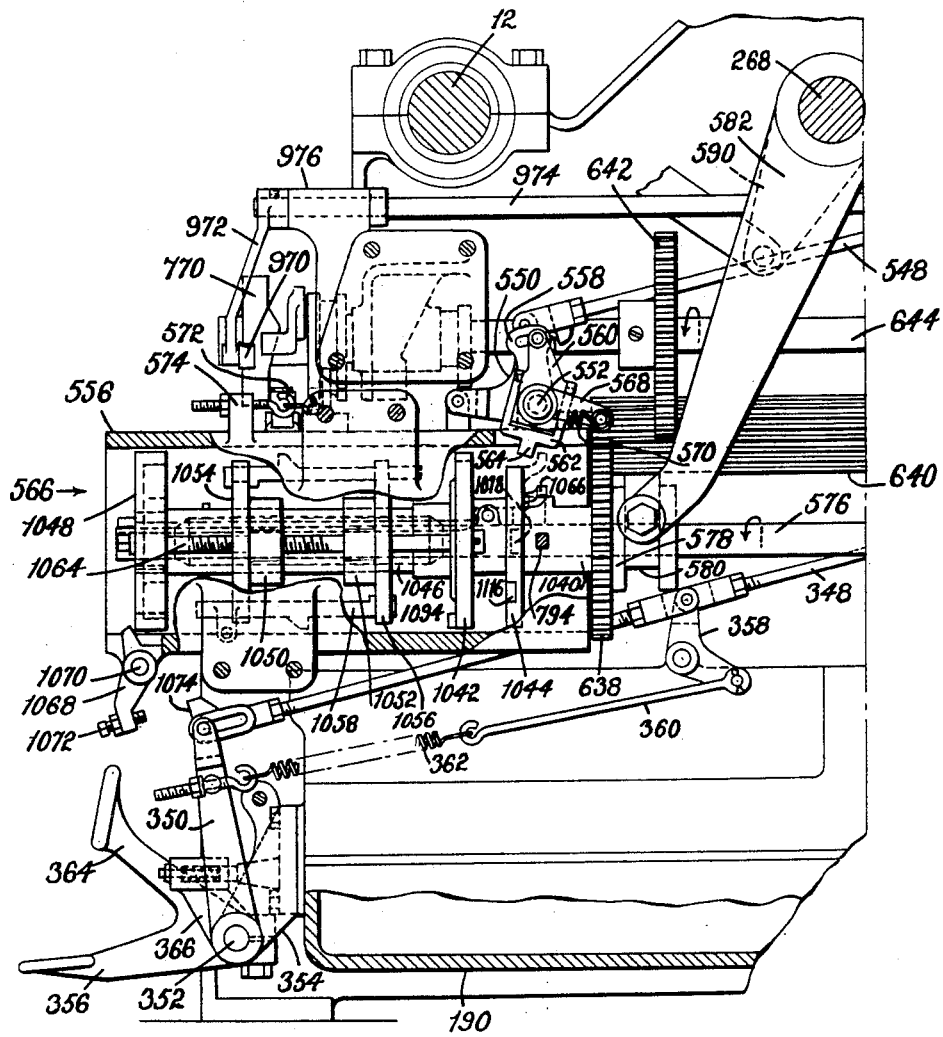
Fig. 21 is a vertical longitudinal section of a portion of the machine illustrating the control unit by which the directions and extents of swinging movements of the jacks and the times during those swinging movements when the rolls are tipped, are determined.

With the machine at rest the spring 312 (Fig. 16) is substantially uncompressed so that the discharge from the pump passes through the valve back to the reservoir and there is no appreciable pressure in the manifold 288. For compressing the spring 312 thereby to set the valve for a high pressure, a pair of toggle links 342, 344 (Fig. 2) are connected respectively to a screw 346 threaded in the top of the plunger 308 and to the frame of the machine. Connected to the knee of the toggle is an adjustable link 348 (Figs. 1, 2 and 21) having a pin-and-slot connection with an arm 350 extending upwardly from and secured to a shaft 352 journaled in a bracket 354 mounted on the front wall of the fluid reservoir 190. Secured to the shaft 352 is a treadle 356, depression of which causes the link 348 to be moved forwardly of the machine thereby straightening the toggle links 342, 344 to compress the spring 312 (Fig. 16) in the pressure regulating valve. Pivoted to the link 348 (Figs. 1 and 21) is one arm of a bell crank lever 358 pivoted to the reservoir 190 and having a link 360 connected to its other arm. The link 360 is connected by a spring 362 to the arm 350, the arrangement being such that upon depression of the treadle 356 the spring 362 is stretched until the rearward end of the link 360 moves past dead center on the other side of the connection between the bell crank lever 358 and the reservoir, whereupon the spring acts to move the link 348 further forwardly of the machine, this movement being permitted by the pin-and-slot connection with the arm 350. Thus the final straightening of the toggle links 342, 344 is effected with a snap action. In the event that the operator should desire to break the toggle so as to stop the machine before the cycle of operations has been completed, the shaft 352 may be turned in a clockwise direction by actuation of an arm 364 connected to the treadle 356. The shaft 352 is also provided with an upwardly extending arm 366 (Fig. 7) carrying a spring-pressed plunger engageable with a projection 368 extending forwardly from the bracket 354 thereby to form a stop for the treadle 356 when the machine is at rest. From the above it will be apparent that upon depression of the treadle 356 the toggle links 342, 344 are straightened thereby compressing the spring 312 of the valve 290 (Fig. 16) so that the valve will not permit passage of the fluid therethrough to the reservoir until the fluid in the system has reached a predetermined pressure. This increase in pressure of the fluid in the system causes actuation of the motor by which swinging of the jacks is effected, moving the jacks rearwardly.

As pointed out above, the leveling rolls are normally urged downwardly to exert pressure on the bottoms of the shoes by the springs 166, 168 (Figs. 2 and 3). Provision is made, however, for lifting the rolls at the beginning of the cycle of operations and maintaining the rolls lifted against the forces of the springs until the toe ends of the shoes have moved into positions below the rolls, and for lifting the rolls at certain times if desired during the cycle of operations of the machine. For this purpose a fluid pressure motor 370 (Fig. 15) is associated with each of the leveling rolls. Integral with the arm 150 at each side of the machine is an arm 372 (Fig. 2) connected by a link 374 to one end of a lever 376 pivoted intermediate its ends to a bracket 378 secured to the frame of the machine. The lever 376 has its opposite end portion forked to straddle a plunger 390, the arms of the forked portion carrying trunnions 392 that extend into a peripheral groove formed in the upper end of the plunger 390. The plunger is fitted to slide in a cap piece 394 and has on its opposite end a T-shaped projection 396 extending into a similarly shaped slot 398 in a piston 400 that is fitted to slide in a cylinder 402. The cap piece 394 is counterbored to receive the upper end of the cylinder 402 and is secured by screws 404 to a casing 406 with the cylinder extending into a bore 408 in the casing and engaging at its lower end a spacer 410 provided with a central opening 412 through which the cylinder communicates with a chamber 414 in the casing 406. Fitted to slide in the chamber 414 is a piston 416. This piston is counterbored to receive a spring 418 that bears at its upper end against the spacer 410 and acts normally to hold the piston 416 in engagement with a pin 420 projecting upwardly from a plate 422 that is secured to the casing 406 by screws 424 to close the lower end of the chamber 414. The casing 406 includes a valve chamber 426 provided with a sleeve 427 in which is slidable a valve 428 held in the position shown in Fig. 15 when the machine is at rest. This permits pressure fluid to flow from the manifold 288 (Figs. 9 and 10) through pipes 430 to the inlet port 432 of the valve associated with each side of the machine. The fluid then flows through ports 434 in the sleeve 427 and through a passageway 436 into the chamber 414 below the piston 416. The space between the piston 416 and the piston 400 is connected by a passageway 438 and port 440 with the upper end of the valve chamber which at this time is closed by a valve element 442. Accordingly, when the pressure in the manifold 288 rises by straightening of the toggles 342, 344 (Fig. 2) upon depression of the treadle, the piston 416 will be moved upwardly against the force of the spring 418 and because of the fluid trapped between the piston 416 and the piston 400 the latter piston will also move upwardly thereby to lift the leveling roll at the corresponding side of the machine against the force of the springs tending to move the roll downwardly so that the rolls will not engage the extreme toe ends of the shoes during the rearward movements of the jacks.

At a predetermined time in the rearward movement of the jacks each of the valves 428 is moved downwardly into a position to interrupt the flow of pressure fluid to the chamber 414 and to open the port 440 to a small reservoir 444 for the fluid above the valve 428. When the valve is moved downwardly by mechanism to be described it closes the port 436 to the inlet port 432 but the fluid is free to flow from the chamber 414 through the port 436 into an annular chamber 446 formed between the sleeve 427 and the chamber 426, thence upwardly through ports 448 of the valve element 442 and into the reservoir 444 in response to downward movement of the piston 416. Overflow of fluid from the reservoir 444 is permitted through an overflow passageway 450 and a pipe 452 communicating with the fluid reservoir.

At its upper end the reservoir 444 is closed by a plate 454 secured to the casing 406 by screws 456. The plate is bored to receive a rod 458 on the lower end of which is formed a T-shaped tongue extending into a similarly shaped groove in the valve element 442. At its upper end the rod 458 is connected to a link 460 which is in turn connected at its upper end to an arm 462 secured to a shaft 464 which is rocked in a clockwise direction as viewed in Fig. 15 at the proper time in the movement of the jacks to lower the valve 428 at each side of the machine whereupon the piston 416 is returned by the spring into the position illustrated permitting downward movement of the piston 400 and the springs 166, 168 are effective to force the rolls against the shoe bottoms.

In order to prevent too sudden a release of the leveling rolls to the actions of the springs such as might tend to cause the rolls to impart hammer blows to the bottoms of the shoes, there is associated with each of the roll-lifting mechanisms a fluid check for retarding movement of the arm 462 in the direction to move the valve 428 downwardly to disconnect the source of pressure fluid from the cylinder 414 and to open the port 438. Pivotally connected to the link 460 is a lever 466 having one end pivoted at 468 to the cap 394. The other end of the lever is connected by a link 470 to a small piston 472 fitted to slide in a bore 474 in the side of the casing 406. The bore is connected to the reservoir 444 through a small central opening 476 and a laterally extending passage 478, the outer end of which is closed by a screw plug 480. At its lower end the bore 474 is formed to provide a seat for a ball valve 482 that may be displaced more or less relatively to its seat by an adjustable screw 484 threaded into the casing and held in adjustable position by a lock nut. Preferably the screw 484 is so adjusted that the ball valve is displaced slightly relatively to its seat to provide a comparatively small opening for the exhaust of fluid from the bore 474 to the reservoir 444 as the piston 472 is moved downwardly in the bore in response to downward movement of the link 460. It will be evident that the fluid is permitted to flow freely from the reservoir by the ball valve 482 in response to upward movement of the piston 472 and that as the piston moves downwardly in the bore the fluid tends to press the ball valve against its seat, the screw 484 holding the ball valve displaced slightly to permit a slow exhaust of the fluid from the bore.

During the operation of the machine and with the valves 428 in their lowermost positions during swinging movements of the jacks beneath the leveling rolls, the heightwise positions of the rolls are varied in accordance with variations in the heightwise curvatures of the shoe bottoms. Any variation in the heightwise position of one of the leveling rolls will cause a corresponding variation in the relative positions of the associated pistons 400 and 416, the piston 400 being movable in the cylinder 402 in response to the heightwise movement of the leveling roll and the reservoir 444 supplying fluid to or receiving fluid from the cylinder 402 to maintain at all times a supply of fluid between the two pistons 400 and 416. Accordingly, each time in the operation of the machine that the valve is moved into the position illustrated to close the port 438 and open the passageway 436 to the inlet port 432, the piston 416 is moved upwardly and through the trapped fluid between it, and the bottom of the piston 400 moves the latter piston upwardly to lift the leveling roll from contact with the bottom of the shoe against the pressure of the springs regardless of the heightwise position of the leveling roll.

For moving the valve 428 downwardly automatically when the jack moves the toe end of the shoe beneath the leveling roll the mechanism shown in Figs. 11, 12, 14 and 23 is provided. Carried by the shaft 464 (Figs. 14 and 15) is an arm 490 connected by a link 492 to an arm 494 rotatable on a shaft 496 (Fig. 11) journaled in a bracket 498 secured to the top of the fluid reservoir 190. Integral with the arm 494 and extending upwardly above the shaft 496 is an arm 500 provided with a curved slot 502. (Fig. 11) in which is movable a pin 504 carried by an arm 506 pinned to the shaft 496. The arm 506 is provided with a pair of spaced depending ears 508, 510 arranged to be engaged by an arm 512 pivoted at 514 to the link 196 connected to the rack 194. Secured to the arm 512 is an arm 516 carrying a pair of stop screws 518, 520 which cooperate with stops 522, 524 on the link 196 to limit the pivotal movement of the arm 512. Integral with the arm 506 pinned to the shaft 496 is an arm 526 (Fig. 12) provided with a pin 528 to which is secured one end of a tension spring 530, the other end of which is secured to a hook 532 carried by the bracket 598.

During the initial rearward movement of the jacks by movement of the rack 194 (Fig. 11) to the left, the arm 512 engages the ear 510 on the arm 506 pivoting this arm in a clockwise direction until the spring 530 moves to the right of the axis of the shaft 496 carrying the arm 506 whereupon the spring acts to complete the clockwise movement of the arm, the pin 504 engaging the right end of the slot 502, thereby moving the arm 494 in a clockwise direction and moving the link 492 forwardly causing downward movement of the valve 428 (Fig. 15) at each side of the machine. This occurs at a predetermined time in the first rearward movement of the jack and preferably at the time when the toe ends of the shoes are below the leveling rolls whereupon the rolls are urged into engagement with the shoes under spring pressure. Other mechanism to be described hereinafter may be provided for automatically operating the valves 428 at predetermined times in the cycle of operation to lift the leveling rolls temporarily to relieve the pressure on the shoe bottoms.

Figure 22:
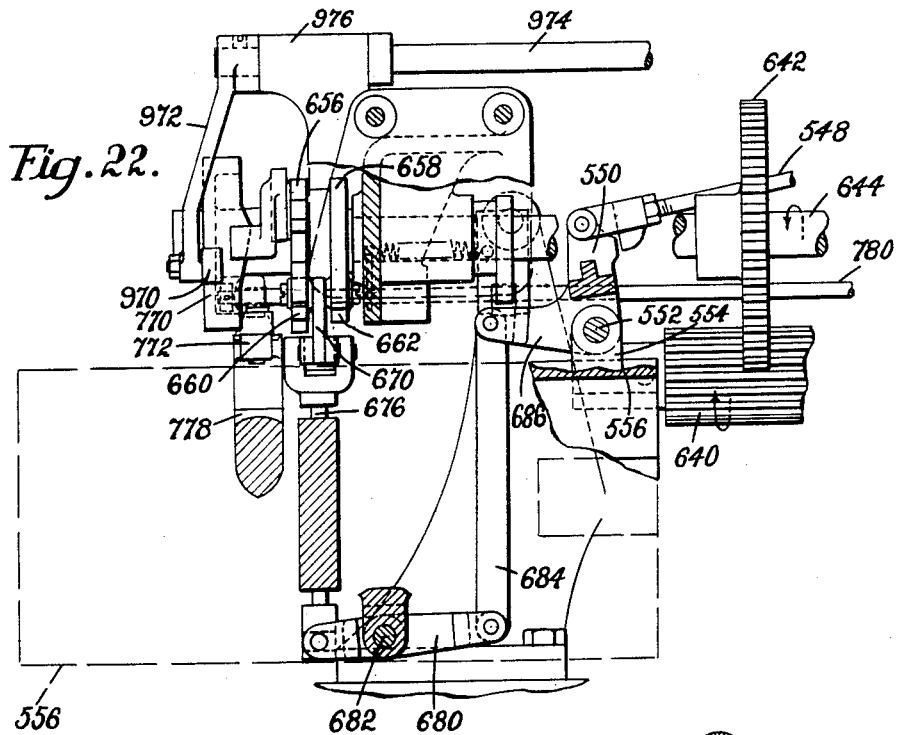
Fig. 22 is a vertical section through mechanism located to the left of the mechanism illustrated in Fig. 21.

The valve 202 (Figs. 2 and 20) is automatically actuated to control the forward and rearward swinging movements of the jacks in accordance with a predetermined cycle by mechanism which will now be described. The upper end of the valve stem 236 is provided with a pair of spaced collars providing between them an annular groove in which are positioned pins carried by the bifurcated ends of an arm 542 carried by a sleeve 543 journaled on a transversely extending shaft 544. Secured to the sleeve and depending therefrom is an arm 546 to which is pivoted the rear end of a link 548, the forward end of which is pivoted to an arm 550 (Fig. 22) carried by a pin 552 supported in a bearing 554 formed on the top of a cylinder 556. Integral with the arm 550 is an arm 558 (Fig. 21) having a slotted upper portion receiving a pin carried by an arm 560 journaled on the pin 552. Pivoted to the arm 560 and depending therefrom is a U-shaped member 562 having a finger 564 passing through a slot in the top wall of the cylinder 556 and arranged to be engaged at predetermined times in the operation of the machine by abutments carried by an indexing mechanism 566 to be described. Rigid with the arm 560 and extending rearwardly from the pin 552 is an arm 568 to which is secured one end of a spring 570 the other end of which is secured to a hook 572 carried by a bracket 574 on the top of the cylinder 556. The indexing mechanism 566 is slidable on a shaft 576 and carries a pair of spaced collars 578 which engage opposite sides of a block 580 (Figs. 6 and 21) carried by the lower end of an arm 582 which is journaled on the shaft 268. This arm is swung during the movements of the jacks as will be presently described thereby to move the indexing mechanism 556 along the shaft 576. As the indexing mechanism is moved toward the right the finger 564 on the U-shaped member 562 is engaged at a predetermined time and this member is rocked in a counterclockwise direction, stretching the spring 570 until it passes by the center of the pin 552 whereupon it snaps the arm 560 and, by reason of the pin-and-slot connection to the arm 558, the link 548 is moved forwardly to actuate the valve 202 and cause a reversal in the flow of fluid to the jacks-operating motor whereupon movement of the jacks is reversed.

For thus operating the arm 582 with the jacks, an arm 590 (Figs. 1 and 2) movable with the arm 582, is connected by a link 592 (Fig. 1) to an upwardly extending arm 594 carried by a rockshaft 596. Secured to this rockshaft and extending forwardly is an arm 598 provided with an arcuate slot 600 which adjustably receives a block 602 carried by the lower end of a link 604, the upper end of which is provided with a block adjustable in an arcuate slot formed in an arm 606 carried by the toe post 18 and extending forwardly of the shaft 12.

Between its ends the link 604 is pivotally connected at 608 to the front end of a supporting arm 610, the rearward end of which is pivoted to a bracket 612 secured to the frame of the machine, the arcuate slots in the arms 598 and 606 being concentric with the pivot 608 when the jack is in its initial shoe-receiving position. During the swinging movements of the jack, motion is transmitted from the arm 606 through the link 604, arms 598, 594, link 592 and arm 590 to the arm 582 to move the indexing mechanism along the shaft 576. The magnitude of the swinging movements of the jacks is automatically varied in accordance with the size of the shoes being treated by adjusting the position of the link 604 relatively to the slots in the arms 598 and 606. For this purpose the heel post 20 has formed thereon a portion 614 that extends rearwardly of its pivotal connection to the toe post 18 and this portion 614 is connected by an upwardly and rearwardly extending link 616 to one arm 618 of a bell crank lever 620 pivoted at 622 on the toe post 18. The other arm of the bell crank lever 620 is pivotally connected to a block 624 which is threaded to receive a rod 626 the forward portion of which is rotatably mounted in a block 628, the rod being held against endwise movement in the block by collars at opposite sides of the block that are fast to the rod. The block 628 is pivotally connected at 632 to the block at the upper end of the link 604.

It will be evident that as the heel post 20 is adjusted toward and from the toe post 18 in accordance with the length of the shoe to be operated upon, the link 604 will move along the arcuate slots in the arms 598 and 606 to vary correspondingly the rate of movement of the arm 582 during the swinging movements of the jack. Fast on the outer end of the rod 626 is a hand wheel 634 for turning the rod to effect an adjustment of the link 604 to vary the effective lengths of the arms 598 and 606 and thus to vary the rate of movement imparted to the arm 582 to accommodate shoes of different styles.

Upon movement of the arm 582 to move the indexing mechanism into operative relation with the finger 564 (Fig. 21) on the U-shaped member 562, the valve 202 is operated to cause a reversal in the swinging movements of the jack whereupon the indexing mechanism is moved forwardly along the shaft 576 by the arm 582. Provision is made for imparting a limited turning movement to the indexing mechanism following each reversal in the swinging movements of the jack so that a different abutment or finger of the indexing mechanism will be moved into engagement with the finger 564 inasmuch as during the leveling operation it is desirable that swinging movements of different extents be imparted to the jacks. For thus imparting turning movements to the indexing mechanism a gear 638 carried thereby meshes with a splined shaft 640 the length of which is sufficient to accommodate the movements of the indexing mechanism along the shaft 576. Also meshing with the gear 640 is a gear 642 carried by a shaft 644 provided on its rearward end with a collar 646 (Fig. 27), the rearward ends of the shafts 576, 640 and 644 being supported by a wall 647. To the collar 646 is fastened one end of a torsion spring 648, the other end of the spring being fastened to a ratchet 650 journaled on the shaft but held against turning movement under the influence of the spring by a pawl 652 (Fig. 29) held in engagement with the teeth of the ratchet by a spring 654. The forward end of the shaft 644 carries a pair of ratchets 656, 658, the teeth of which are staggered as shown in Fig. 24. Engageable with the ratchets are a pair of pawls 660, 662 pivoted at 664 in the outer end of a bracket 666 in which the forward end of the shaft 644 is journaled. The pawl 662 is provided with a tail portion 668 which is connected by a link 670 to one end of a lever 672 the other end of which is connected by a link 674 to the pawl 660. Intermediate its ends the lever 672 is pivotally connected to a link 676 slidable in a guide 678 formed on the side of the cylinder 556, the lower end of the link being connected to a lever 680 (Fig. 22) pivoted at 682 on a boss formed on the lower portion of the cylinder 556. The other end of the lever 680 is pivotally connected to an upwardly extending link 684, the upper end of which is pivoted to a rearwardly extending arm 686 of the bell crank lever 550. Upon forward movement of the link 548 to operate the valve 202 and reverse the directions of swinging movements of the jacks, the bell crank lever 550 is moved in a counterclockwise direction as viewed in Fig. 22 and acts through the link 684 and lever 680 to move the link 676 upwardly and by reason of the frictional engagement of one of the teeth of the ratchet wheel 658 with the end of the pawl 662, the lever 672 is first swung about its pivotal connection to the link 670 in the direction to move the pawl 660 upwardly into engagement with the ratchet wheel 656 after which the lever 672 is swung reversely about its pivotal connection to the link 674 to move the pawl 662 downwardly out of engagement with the ratchet wheel 658. As the pawl 662 is thus moved the shaft is rotated in a clockwise direction (Fig. 24) until one of the teeth of the ratchet wheel 656 engages the end of the pawl 660. Subsequently at the completion of the next swinging movements of the jacks the link 676 is moved downwardly swinging the lever 672 reversely to move the pawl 660 downwardly and the pawl 662 upwardly permitting the shaft 664 to be moved by the torsion spring another step in a clockwise direction. Each of these rotational movements of the shaft 664 indexes the mechanism 566 to move another finger into position to operate the valve 202 at a predetermined time in the next swinging movement of the jacks.

Mechanism is provided for periodically moving the ratchet 650 (Fig. 29) in a clockwise direction to wind the spring 648 so that there will always be sufficient tension in the spring to index the shaft 576. For this purpose a motor 690 (Figs. 27, 28 and 32) is provided. This motor comprises a rack 692 provided at its upper and lower ends with pistons 694, 696 slidable in cylinders 698, 700. The outer ends of the pistons are provided with caps into which are threaded ends of pipes 702, 704 through which pressure fluid is admitted into the end of one or the other of the cylinders to move the rack 692 vertically in one direction or the other. The teeth of the rack 692 engage a pinion 706 formed on a casing 708 (Fig. 29A) housing a ratchet 710 rigidly connected to the ratchet 650 to which is secured one end of the torsion spring 648. The casing 708 has a cylindrical extension 712 in which is slidable a pawl 714 engageable with the teeth of the ratchet 710 and urged into engagement therewith by a spring 716, the upper end of which engages a block 718 secured by a cotter pin 720 in the upper part of the extension 712. Upon movement of the rack 692 upwardly as viewed in Fig. 32 the housing 708 is moved in a counterclockwise direction, the pawl 714 causing movement of the ratchet in the same direction, winding up the rearward end of the spring 648. The pawl 652 (Fig. 29) maintains the ratchet 650 in the position to which it is moved by the motor 690, upon reverse movement of the rack 692.

For controlling the operation of the motor 690 a valve mechanism 722 (Fig. 33) is provided. This valve includes a casing 724 having an inlet connection 726 through which fluid under pressure is conducted. In the side wall of the casing 726 is a pair of ports 728, 730 connected respectively to the pipes 702 and 704. Slidable within the casing is a hollow valve element 732 which, in the position illustrated, obstructs the flow of fluid through each of the pipes 702 and 704. The opposite ends of the valve element 732 are provided with crossbars 734, 736 connected by a spring 738, and connected to the crossbar 734 is a valve stem 740 extending upwardly through the top of the valve casing and provided at its upper end with a pair of spaced collars 742 between which are received pins 744 carried by one end of a lever 746 pivoted at 748 to a bracket carried by the top of the valve housing. The other end of the lever is recessed (Fig. 27) to receive the end of a rod 750, the lower end of which engages a recess in an arm 752 (Figs. 28 and 30) pivoted at 756 in the wall 647. Integral with the arm 752 is an arm 754 provided with a roll 758 engageable with the periphery of a cam 760 carried at the rearward end of the shaft 640. Once in each revolution of the shaft 640 the cam 760 moves the lever 746 in a clockwise direction against the force of a spring 762, depressing the valve member 732 and permitting fluid to flow from the pipe 726 through the pipe 704 into the bottom cylinder 700 of the motor 690. Fluid from the cylinder 698 exhausts through the pipe 702 through the interior of the valve element 732 and flows through a pipe 764 to the sump. The rack 692 is now moved upwardly winding up the spring 648. Subsequently the valve is moved upwardly by the cam, moving the rack 692 downwardly and returning the housing 708 to its initial position.

It may be desirable at certain times during the forward and rearward swinging movement of the jacks to relieve the pressure of the leveling rolls on the shoe bottoms as, for example, in certain positions of the leveling rolls when the ball lines of the shoes are being traversed. For this purpose the shaft 644 (Figs. 22, 23, 25 and 47) may carry at its forward end a cam 770 with the rearward face of which cooperates a cam roll 772. This roll is carried at one end of a lever 774 pivoted at 776 on a boss 778 formed on the cylinder 556. The other arm of the lever has an apertured end which slidably receives a rod 780 having a collar 782 at its forward end engageable with the adjacent surface of the lever 774. On the rearward end of the rod 780 is secured a connector 784 (Fig. 11) the end of which is slotted at 786 to receive the pin 528 carried by the arm 526. With the machine in operation the arm 526 is rocked during the initial movements of the jacks in a clockwise direction from the position illustrated in Figs. 11 and 48 so that the pin 528 occupies a position at the rearward or right hand end of the slot 786 as viewed in Fig. 11. Accordingly, when the cam roll 772 engages a high point on the cam 770 the lever 774 is moved in a counterclockwise direction as viewed in Fig. 25 exerting a forward pull on the rod 780 which, through the pin 528, arms 526, 506, 500, 494 operates to move the rod 492 forwardly thereby lifting the valves 428 (Fig. 15) into the position shown so that fluid pressure flows below the pistons 416 and through the mechanism heretofore described causing the pressure exerted by the leveling rolls to be relieved.

Figure 47:
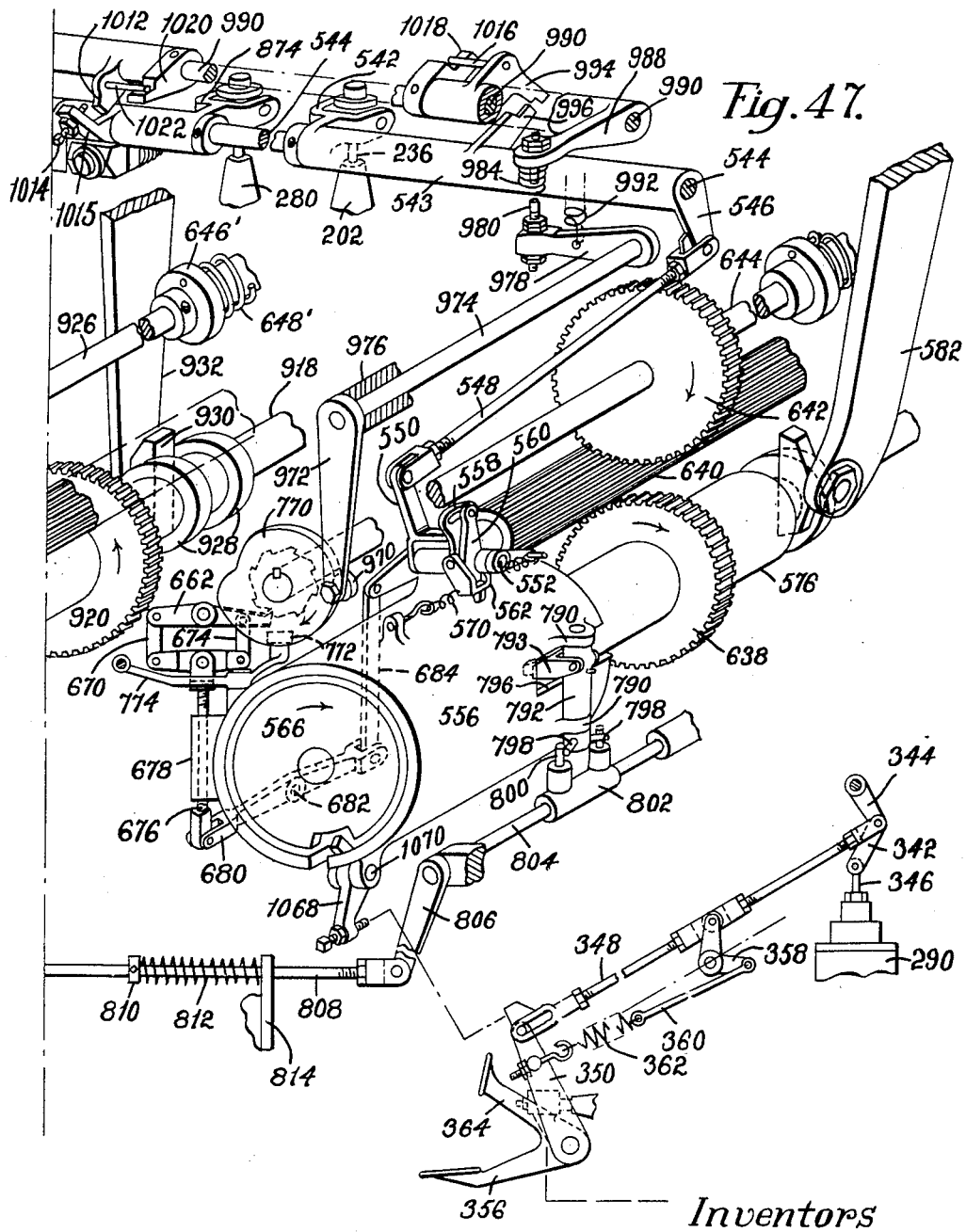
Fig. 47 is a similar view of the structure in the right side of the machine.

The indexing mechanism 566 (Fig. 21) is also employed for determining those times in the cycle of operations when the leveling rolls are tipped in one direction or another, and other mechanism to be described determines the directions in which the rolls are tipped when such tipping movements are called for by the indexing mechanism 566. As shown in Figs. 31 and 47, there is journaled in a pair of ears 790 extending laterally from the cylinder 556 a vertical rocker member 792. Pivoted upon opposite sides of the rocker member is a pair of arms 793 of a U-shaped member providing a finger 794 (Figs. 6 and 21) which extends through an aperture 796 in the side of the cylinder 556 and is located in the path of movement of the abutments on the indexing mechanism 566. A pair of pins 798 project outwardly from the lower end of the rocker member and are positioned to engage one or the other of a pair of pins 800 which extend upwardly from a support 802 carried by a shaft 804 extending forwardly and rearwardly in the machine. It will be apparent that upon rotational movement of the rocker member 792 in either direction from a central position, motion will be imparted by one of the sets of pins 798 and 800 to the shaft 804, turning this shaft in a clockwise direction as viewed in Fig. 6 regardless of the direction of movement of the rocker member.

The shaft 804 extends forwardly of the frame of the machine and carries a downwardly extending arm 806 having a pivotal connection with a rod 808 (Figs. 5, 6, 39 and 47) extending transversely of the machine and carrying intermediate its ends a collar 810 forming an abutment for one end of a compression spring 812, the other end of which bears against a stop plate 814 through which the rod 808 passes. To the left end of the rod is pivoted a bar 816 by a pin 818 which is supported in the lower end of an arm 820 pivoted at 822 to the frame of the machine. To the left end of the bar 816 is adjustably secured an arm 824 having a recess engageable with a pin 826 in the lower end of an arm 828 fast on a shaft 830 journaled in brackets 832 carried by a cylindrical housing 834 of an indexing mechanism 835 by which the directions of tipping movements of the leveling rolls are controlled. The right end of the arm 824 has an inclined surface 836 (Fig. 39) engageable with a cam roll 838 journaled on the frame of the machine. Upon movement of the rod 808 to the right by operation of the rocker member 792 the arm 828 is moved in a counterclockwise direction until the arm 824 is forced upwardly by engagement of the inclined surface 836 with the roll 838. The bar 816 has a portion that extends to the right of the pivot pin 818 and is connected by a spring 840 to the arm 820 so that the left end of the arm 824 is urged downwardly into engagement with the pin 826.

The movement of the rod 808 to the right causing the shaft 830 to be moved in a counterclockwise direction effects the tipping movements of the leveling rolls in one direction or the other as determined by the indexing mechanism 835 in the cylinder 834. The shaft 830 carries a pair of rigidly connected arms 842 (Figs. 35, 39 and 46) having forked ends in which are pivoted upwardly extending striker bars 844. One or the other of these bars is caused to assume a vertical position as shown in Fig. 39 prior to movement of the rod 808 to the right, and the directions in which the leveling rolls are tipped depends upon which one of these striker bars is so positioned. Pivoted on a stud 846 secured to a boss 848 on the lower part of the cylinder 834 is a rocker 850 having laterally extending arms 852 as shown in Figs. 35 and 39 which lie directly above the striker bars 844 when they are in vertical positions. Movement of the rod 808 to the right, moving the shaft 830 in a counterclockwise direction causes the striker bars 844 to move upwardly and depending upon which bar is in a vertical position the rocker 850 will move in one direction or the other about the stud 846. This rocker includes an upwardly extending arm 854 to which is pivoted one end of an upwardly and rearwardly extending rod 856 the other end of which is connected to an arm 858 (Figs. 10 and 15), journaled on the transversely extending shaft 544. Integral with the arm 858 is a downwardly and laterally extending arm 862 arranged to be held in engagement with the forward surface of a depending arm 864 of a lever 866 journaled on the shaft 544. For maintaining the arms 862, 864 normally in engagement with each other a pin 868 passes through the arms and at its rearward end carries nuts 870 between which and the rearward surface of the arm 864 is confined a compression spring 872. The lever 866 has a rearwardly extending bifurcated arm 874 carrying pins received in a groove between collars 876 of the stem of the valve 280 by which the flow of pressure fluid to the outer ends of the cylinders 250, 252 (Fig. 13) is controlled. From the above it will be seen that upon movement of the rod 808 (Fig. 39) to the right the rocker 850 will be tipped in one direction or the other depending upon the previous setting of the striker bars 844 so as to operate the valve 280 to admit pressure fluid into one or the other of the cylinders 250, 252 causing tipping movements of the leveling rolls as long as the rocker 850 is tipped.

The striker bars 844 are held temporarily in their elevated positions by mechanism shown most clearly in Figs. 39 and 46. Connected to the arms 842 carrying the striker bars 844 is an arm 878 extending on the opposite side of the shaft 830 and providing an abutment arranged to be engaged by a latch 880 carried by a shaft 882, the arm 878 and the latch 880 being urged toward each other into latching engagement by a spring 884. The latch 880 includes an arm 886 arranged to be moved downwardly to urge the latch 880 out of engagement with the arm 878 by abutments carried by the indexing mechanism 835 to be described. When the latch is thus moved downwardly the spring 884 moves the adjacent end of the arm 878 upwardly whereupon the striker bars 844 move downwardly into their original positions as shown in Fig. 39. Upon movement of the arm 828 in a counterclockwise direction to move the striker bars 844 upwardly, the arm 878 is moved downwardly to underlie the latch 880 thereby holding the bars in their upper positions. After they have returned to their downward positions the valves 280 return to their neutral positions under the influence of a pair of springs 888 (Fig. 35) engaging opposite sides of a block 890 on a shaft 892, the block being connected by a pin 894 to the arm 854, the outer ends of the springs engaging collars carried by the shaft 892. It will be seen that the springs 888 act to move the arm 854 into the position shown in Fig. 35 when permitted to do so causing the rod 856 to move the roll-tipping valves into their neutral positions.

For moving the striker bars 844 selectively into vertical operative positions to determine in which direction the leveling rolls will be tipped, mechanism shown in Figs. 36, 39 and 46 is provided. The striker bars 844 are connected intermediate their ends to links 896 which are in turn connected to arms 898 depending from control members 900, 902 journaled on a shaft 903 secured within the wall of the cylinder 834. The control members 900, 902 include horizontally extending portions 904, 906 respectively, arranged to be engaged and depressed selectively by fingers carried by the indexing mechanism 835. Depending upon which of the control members is operated by the control mechanism one or the other of the striker bars 844 is moved into a vertical position to cause operation of the roll-tipping valves at the proper time in the forward and rearward swinging movements of the jacks as determined by the control mechanism 566. For releasing the latch 880 (Fig. 39) at the proper time in the tipping movements of the leveling rolls, thereby to interrupt the tipping movements thereof, the indexing mechanism 835 is employed. Carried by a shaft 908 (Figs. 39, 40 and 46) journaled in ears 910 depending from the cylinder 834 is a release member 912. This release member includes an abutment 914 which extends upwardly through the cylinder wall in position to be engaged by abutments carried by the control mechanism to rock the release member in one direction or the other at predetermined times in the tipping movements of the leveling rolls. The release member includes a pair of laterally extending arms 916 which overlie the ends of the arms 886 so that regardless of the direction of movement of the release member about the axis of the shaft 908 one or the other of the arms 886 of the latch 880 will be depressed moving the latch out of engagement with the arm 878 whereupon the spring 884 moves the striker bars 844 downwardly into their original positions. It will thus be seen that the leveling rolls are tipped at predetermined times a predetermined amount whereupon the tipping movements cease until another tipping movement is called for by the control mechanism 566 and the directions of the tipping movements are determined by the control members 900, 902 (Fig. 36) which move one or the other of the striker bars into position to cause actuation of the roll-tipping valve 280.

The indexing mechanism 835 in the cylinder 834 is slidable on a shaft 918 (Fig. 35) and carries a pinion 920 which meshes with a splined shaft 922 driven by a pinion 924 on a shaft 926. For effecting lengthwise movement of the control mechanism to determine the extent of tipping movements of the rolls, the control mechanism at its rearward end is provided with a pair of circular flanges 928 forming between them an annular groove receiving a block 930 pivoted to the lower end of an arm 932 carried by the shaft 268 and connected to the arm 266 which is operated by the roll-tipping motor as shown in Fig. 13. Accordingly, as this motor operates, the arm 932 is rocked about the axis of the shaft 268 to slide the indexing mechanism along the shaft 918, operating the release member 912 at predetermined times thereby controlling the extent of each tipping movement of the leveling rolls.

The shaft 926 is provided at its rearward end with a collar 646' (Fig. 34) to which is connected one end of a torsion spring 648' the other end of the spring being fastened to a ratchet 650' journaled on the shaft but held against turning movement under the influence of the spring by a pawl similar to the pawl 652 (Fig. 29.) The forward end of the shaft 926 carries a pair of ratchets 656', 658' (Fig. 42) arranged in the manner of the ratchets 656, 658 associated with the jack-operating control mechanism. Engageable with the ratchets is a pair of pawls 660', 662' pivoted at 664' in the outer end of a bracket 666' in which the forward end of the shaft 926 is journaled. The pawl 662' is provided with a tail portion 668' connected by a link 70' to one end of a lever 672' the other end of which is connected by a link 674' to the pawl 660'. Intermediate its ends the lever 672' is pivotally connected to a rod 676' slidable in a guide 678' formed on the side of the cylinder 834. Mechanism is provided for moving the rod 676' upwardly and downwardly alternately during each roll-tipping movement, thereby to operate the pawls 660' and 662' in the manner described in connection with the pawls 660, 662 whereupon the torsion spring acting on the shaft 926 causes the control mechanism to turn in a step-by-step manner.

Carried by the shaft 908 (Fig. 37) is a cam 934 having a concave upper surface engaged by a cam roll 936 carried by an arm 938, the lower end of which is slotted to receive the shaft 908 which thereby guides the lower end of the arm in its vertical movements. During each rocking movement of the shaft 908 to move the rod 856 (Fig. 35) either forwardly or rearwardly to operate the roll-tipping valves, the arm 938 is moved upwardly. The upper end of this arm is connected to an arm 940 carried by a shaft 942 journaled in bearings on the top of the cylinder 834. The shaft 942 carries a depending arm 944 to which is pivoted one end of a slidable rod 946. The rod 946 is supported for sliding movement by a block 948 (Fig. 41) pivoted to the rearward end of an arm 950 carrying near its forward end a pin 952 received between flanges 954 carried by the rod 676'. The arm 950 extends forwardly from the pin 952 and carries a block 956 slidable on a vertical rod 958 (Fig. 40) and being normally maintained in a midposition as shown therein by compression springs 960, 962 engaging the top and bottom surfaces respectively of the block 956. The forward end of the rod 946 engages a concave surface of a lever 964 pivotally carried by a pin 966 threaded into the side wall of the cylinder 834. The lever has a pair of forwardly extending arms 968 carried by the pin 952. During each movement of the rod 856 to operate the roll-tipping valve, the arm 938 (Fig. 37) moves upwardly causing forward movement of the rod 946 to move the lever 964 about the pivot pin 966 in one direction or the other depending upon the point of contact between the rod 946 and the concave rearward face of the lever. As illustrated, the rod 946 engages the upper portion of the concave surface of the lever moving it about the pivot pin 966 in a counterclockwise direction, thereby causing downward movement of the rod 676' to move the pawl 662' upwardly and move the pawl 660' downwardly, thus permitting indexing movement of the shaft 926 under the influence of the torsion spring thereby to turn the control mechanism 835 in the cylinder 834 a predetermined amount. The downward movement of the pin 952, caused by the counterclockwise movement of the lever 964, changes the position of the arm 950 carrying the block 948 which supports the rod 946 so that as the rod is retracted at the end of the indexing operation it engages the lower portion of the concave surface of the lever 964 whereupon, after the next valve operation to cause a subsequent roll-tipping movement, the lever 964 is moved in a clockwise direction and thus it will be seen that the rod 676' is alternately moved up and down.

Mechanism for periodically winding the torsion spring 648' is provided which is substantially the same as that described above for winding the spring 648 (Fig. 27). A motor and control valve identical with those illustrated in Figs. 32 and 33 and heretofore described may be provided. The arrangement of these mechanisms is shown in Fig. 34 and it will be noted that the arrangement is similar to that of Fig. 30, like parts being designated by like reference characters, distinguished by primes after the characters in Fig. 34.

Provision is made for imparting slow outward tipping movements to the leveling rolls when the rolls are approaching the toe ends of the soles along the outer margins thereof, and then interrupting the swinging movements of the jacks and tipping the rolls inwardly across the toe ends of the soles. Mechanism for causing the interruption in the swinging movements in the jacks includes the cam 770 (Figs. 21, 25, and 47) on the forward end of the shaft 644 with the periphery of which cooperates a cam roll 970. This roll is carried by an arm 972 secured to and depending from the front end of a forwardly and rearwardly extending rock shaft 974, the front end of which is journaled in a bracket 976 carried by the cylinder 556. The rearward end of the shaft (Fig. 9) is journaled in the frame of the machine and carries an arm 978 in the outer end of which is secured a vertical rod 980. Secured to this rod is a collar 982 forming an abutment for one end of a compression spring 984, the upper end of which engages a washer 986 slidable on the rod 980. This rod passes through an opening in an arm 988 rotatable on a transversely extending shaft 990. The upper end of the rod 980 is threaded to receive nuts engageable with the top of the arm 988 so as to limit downward movement of the rod with respect to the arm. A spring 992, connected between the arm 978 and the frame of the machine, acts to maintain the cam roll 970 in engagement with the periphery of the cam 770. Integral with the arm 988 and extending rearwardly from the shaft 990 is a latch 994 arranged to cooperate with an arm 996 movable with the valve-actuating arm 542. The arrangement is such that when the cam 770 (Fig. 47) has rotated approximately 180° from the position illustrated, the cam roll 970 enters a recess in the periphery of the cam whereupon the spring 992 urges the arm 978 upwardly and acts through the spring 984 to move the latch 994 downwardly from the position shown in Fig. 47. It will be understood that when this happens the jacks are moving forwardly and the valve stem 236 is in a down position from that illustrated so that the arm 996 is spaced from the latch 994. However, after the indexing mechanism 566 has moved to a predetermined position the U-shaped member 562 is operated whereupon the arm 560 moves the link 548 rearwardly moving the valve member 230 (Fig. 20) upwardly from its lowermost position. This upward movement is interrupted by engagement of the arm 996 with the latch 994 and the valve stops in a midposition in which both the ports 222 and 224 are closed, and the jacks accordingly come to rest.

The forward end of the shaft 926 (Figs. 35, 46 and 39) carries a cam 998 with the periphery of which cooperates a cam roll 1000 on the lower end of an arm 1002 depending from a forwardly and rearwardly extending shaft 1004 on the rearward end of which is mounted an arm 1006 (Figs. 10 and 46) which is connected by a link 1008 to an arm 1010 rotatable on the shaft 990. A spring 1007 connected to the arm 1006 urges the arm upwardly. Integral with the arm 1010 is a forwardly extending stop arm 1012 arranged to cooperate with an adjustable screw 1014 in the forward end of an arm 1015 (Fig. 47) movable with the arm 874 by which the valve 280 is operated. With the arm 1012 rocked in a clockwise direction slightly from the position shown in Fig. 15, upon forward movement of the rod 856, the screw 1014 engages the adjacent end of the arm 1012 to permit the roll-tipping valve to open only slightly to cause slow tipping movements of the leveling rolls.

For coordinating the mechanism by which the movements of the jacks are arrested and the slow tipping movements of the leveling rolls are started, mechanism best shown in Figs. 46 and 47 is provided. The latch 994 carries a pin 1016 which projects laterally therefrom and is arranged to cooperate with a rearwardly extending arm 1018 which is fast on the shaft 990. Also secured to the shaft 990 is a forwardly extending arm 1020 arranged for engagement with a pin 1022 extending laterally from the stop arm 1012. Upon the indexing movement of the control mechanism 566 at the beginning of the final movement of the jacks before they come to rest temporarily, the depression in the cam 770 registers with the cam roll 970 and the latch 994 is moved downwardly. Similarly during the tipping movements of the leveling rolls preceding the slow tipping movements effected by the mechanism described, the depression in the periphery of the cam 998 moves into register with the cam roll 1000. Accordingly, the arm 1006 is moved upwardly by the spring 1007 bringing the stop arm 1012 into cooperative relation to the screw 1014. During the downward movement of the latch 994, the pin 1016 moves the arm 1018 downwardly rotating the shaft 990 and moving the arm 1020 upwardly so that it is in engagement with the pin 1022 which also has moved upwardly from the position shown in Fig. 47. Before the jacks come to rest, the valve 280 is operated to start the slow tipping movements of the leveling rolls. These movements continue until the rolls are at the toe ends of the shoes. At this time, the indexing mechanism 566 moves the link 548 rearwardly until the arm 996 engages the latch 994 at which time the outlet ports in the valve 202 are closed and the spring 570 is under tension. The indexing mechanism is turned by the shaft 644 causing operation of the rocker member 792 which, through mechanism heretofore described, moves the rod 856 rearwardly, operating the valve 280 to reverse the tipping movements of the rolls.

When the rolls have tipped sufficiently toward the insides of the shoes, the control mechanism associated therewith is moved along the shaft 918 sufficiently to cause rocking movement of the release member 912 whereupon the shaft 908 is rocked, permitting indexing of the shaft 926 by the torsion spring 648', turning the cam 998, whereupon the cam roll 1000 moves out of the depression in the cam 998 moving the arm 1002 outwardly which causes the stop arm 1012 to move downwardly into the position illustrated. The springs 888 act on the rod 856 to move the valve 280 to its midposition interrupting the tipping movements of the rolls. The pin 1022 carried by the stop arm 1012 moves downwardly with the stop arm and acts through the arm 1020 to turn the shaft 990, carrying the arm 1018 upwardly into engagement with the pin 1010 and moving the latch 994 out of engagement with the arm 996. The spring 570 now completes the movement of the rod 548 whereupon the valve stem 236 moves upwardly to admit pressure fluid into the jacks-operating motor to start the rearward swinging movements of the jacks.

Figure 23:
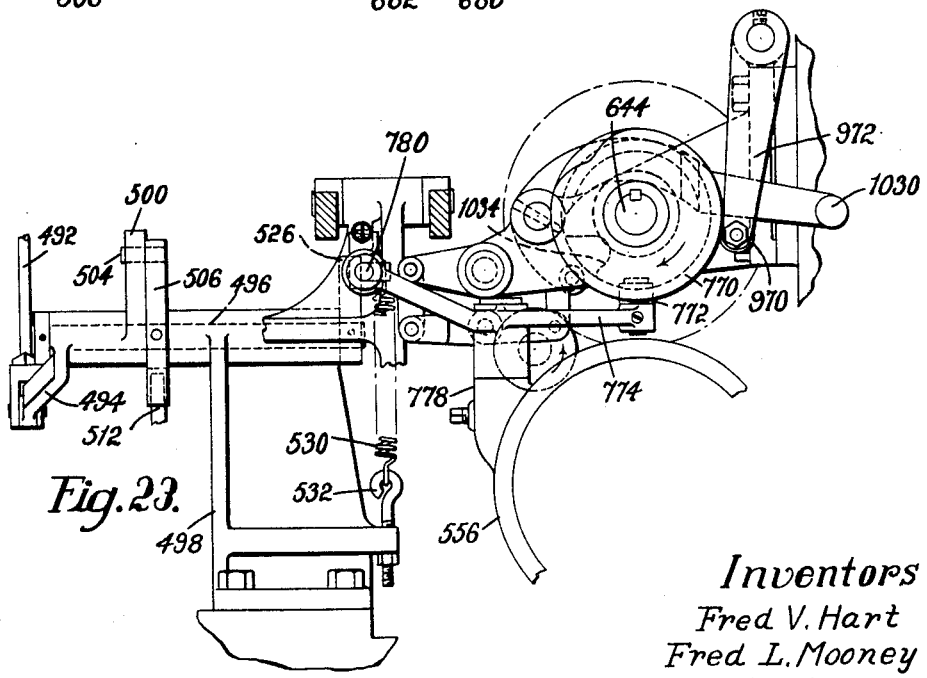
Fig. 23 is a front elevation partly in section of the mechanism shown in Fig. 22.

In order to vary the time in the cycle of operations during which the rolls are tipped slowly and at which the jacks come to rest, or to eliminate either of these phases of the operation, the cams 770 and 998 are readily removable from the shafts 644 and 926 so that they may be replaced by other cams of suitable design. As shown in Figs. 43 and 44, the cam 998 is made integral with the ratchets 656' and 658', the ratchets and cam being held against turning by a key 1024 on the shaft 926. An arm 1026 is arranged to engage the forward surface of the ratchet 656' thereby to hold the assembly against axial movement of the shaft 926 during the operation of the machine. The arm 1026 is carried by a shaft 1028 (Fig. 39) and is provided with a handle portion 1030 by which it may be lifted out of engagement with the ratchet 656'. Provision is made for preventing turning of the shaft 926 by the torsion spring when the shaft is no longer held against turning movement by the pawls 660', 662'. For this purpose a locking disk 1032 (Figs. 39 and 43) is pinned to the shaft 926 and is provided with a recess 1034 engageable by a roll 1036 carried by an arm 1038 on the rearward end of the shaft 1028 carrying the arm 1026. The arrangement is such that when the arm 1026 is lifted out of engagement with the ratchet 656' the roll 1036 is moved into the recess 1034 thereby effectively locking the shaft 926 against rotation so that the cam 998 with the pawls 656', 658' may be readily moved from the shaft and replaced by another assembly, permitting a different cycle of operation. A similar arrangement is provided for holding the cam 770 on the shaft 576 as illustrated in Fig. 23, similar parts being identified by like reference characters.

The direction and extent of the swinging movements of the jacks and the time during the swinging movements of the jacks when the rolls are tipped are determined by the control mechanism 566 illustrated in Figs. 21, and 48 to 52. Carried by a sleeve 1040 on the shaft 576 forwardly of the gear 638 are spaced disks 1042 and 1044. Forwardly of the sleeve 1040 surrounding the shaft 576 is a bushing 1046, the forward end of which is received by a disk 1048 held on the shaft by a key similar to that shown in Fig. 27 of the Winkley Patent No. 2,322,334, granted June 22, 1943. Slidable along the bushing 1046 are sleeves 1050, 1052 on which are formed respectively, flanges 1054, 1056 each of which is provided with a plurality of spaced notches or slots as shown in Fig. 49 to receive finger pieces 1058. The finger pieces are each recessed at one end to straddle one of the flanges 1054, 1056 and are each fitted to slide in a slot in the other flange. The several fingers are held in the slots by rings 1060, 1062 that surround the flanges and are secured thereto by screws. The sleeves 1050, 1052 are adjustable along the bushing 1046 by means of rods 1064 that are rotatably mounted in the disks 1048, 1042, one of the rods being threaded in the flange 1054 and extending through an enlarged opening in the flange 1056 and the other rod being threaded in the flange 1056 and extending through an enlarged opening in the flange 1054. The construction and arrangement of the parts thus far described is generally similar to that shown in the Winkley patent above identified to which reference may be had for a more complete description.

At the end of a cycle of operations a finger 1066 (Figs. 21 and 51) carried by the disk 1044 engages the finger 564 of the U-shaped member 562 moving it into the position illustrated, causing the rod 548 to be moved rearwardly and the jacks-swinging valve 202 to be moved into the position shown in Fig. 20. For terminating the operation of the machine at this time the disk 1048 engages a lever 1068 pivoted at 1070 to a boss depending from the cylinder 566 at its front end, rocking the lever in a counterclockwise direction. An adjustable set screw 1072 carried by the lower end of the lever engages an abutment 1074 mounted at the forward end of the link 348 thereby to move this link rearwardly breaking the toggle links 342, 344 (Fig. 2) and moving the pressure-regulating valve into the position shown in Fig. 16. The pressure in the system now drops to such a low value that there is insufficient power available to move the jacks rearwardly. The movement of the rod 548 to operate the valve 202 causes the mechanism 556 to be indexed into the position shown in Figs. 48 to 51 wherein a recess 1076 (Fig. 48) in the periphery of the disk 1048 is moved into alinement with the upper end of the lever 1068 so that this lever is movable in a clockwise direction upon subsequent treadling of the machine thereby to permit operation of the pressure-regulating valve whereupon the pressure in the system rises to a sufficiently high value to cause the jacks to be swung rearwardly.

The cycle of operations of the jacks and the tipping movements of the rolls are illustrated diagrammatically in Fig. 53 in which the swinging movements of the jacks are for the most part indicated by lines extending lengthwise of the shoe and the tipping movements of the rolls are represented by lines inclined to the longitudinal center line of the shoe. The cycle of operations begins with the leveling rolls tipped toward the outsides of the shoes as indicated at A. Upon treadling the machine the jacks start to move inwardly and after a slight inward movement an inclined surface 1078 in the periphery of the disk 1044 strikes the inner end of the finger 794 extending through the side of the cylinder 566 to cause operation of the rolls-tipping valve 280 thereby to move the rolls into positions in which the centers of pressure are along the center lines of the shoes with the axes of the rolls in substantially horizontal positions. These tipping movements of the rolls are indicated by the line B—C, both jacks meanwhile continuing their inward movements as indicated by the line C—D—E—F—G. The portions D—E and F—G of this line indicate further tipping movements of the rolls in small increments towards the outsides of the shoes at different points in the inward movements of the jacks and are caused by a finger 1080 on one of the finger pieces 1058 (Fig. 52) and by a pin 1082 carried by the disk 1048 respectively by their successive engagement with the finger 794 (Fig. 21) causing operation of the rolls-tipping valve. The direction and extent of each of these tipping movements are controlled by the mechanism 835 which will be hereinafter described in detail.

With the leveling rolls in engagement with the shoe bottoms near their heel ends as indicated at G, the finger 564 (Fig. 21) is engaged by the rearward surface of the disk 1048 thereby to move the rod 548 forwardly operating the valve 202 causing a reversal in the movements of the jacks and an indexing movement of the control mechanism 556. The pivotal mountings of the members carrying the fingers 564 and 794 insures that these fingers will not interfere with the successive indexing movements of the control mechanism. The jacks now move outwardly as represented by the line G—H—I, the finger 794 being operated toward the end of this movement by a finger 1084 (Fig. 52) causing a further swinging movement of each leveling roll toward the outside of the shoe. At the point I, a finger 1086 on one of the finger pieces engages the finger 564 (Fig. 21) again operating the valve 202 and causing the jacks again to move inwardly as represented by the line I—J, whereupon the disk 1048 again operates the finger 564 moving rod 548 rearwardly of the machine. At the beginning of this movement the leveling rolls are again tipped by the engagement of a pin 1088 on the disk 1048 with the finger 794. The jacks now move outwardly of the machine as represented by the line J—K—L whereupon another tipping movement of the rolls, represented by the line L—M, this time inwardly of the shoes, is effected by engagement of a finger 1090 on one of the finger pieces with the finger 794. The jacks meanwhile continue their outward swinging movement as represented by the line M—N but during this movement a finger 1092 on the same finger piece as finger 1090 causes operation of the valve 280 which at this time is prevented from moving far due to engagement of the stop screw 1014 (Fig. 47) with the stop arm 1012 which has been moved into alinement with the stop screw by the cam 998. Accordingly the rolls are tipped slowly and outwardly until the jack brings the toe ends of the shoes under the leveling rolls whereupon a pin 1094 on the disk 1042 operates the valve 236. Inasmuch as the latch 994 (Fig. 47) has been moved downwardly at this time by the cam 770 the valve 202 is moved into a midposition in which the jacks are held stationary while the leveling rolls are tipped inwardly of the shoes across the toe ends thereof, as indicated by the line N—O, this tipping movement being initiated by engagement of the disk 1042 with the finger 794.

At the completion of this tipping movement the arm 1012 (Fig. 47) is moved downwardly causing upward movement of the latch 994 as heretofore described. The spring 570 now moves the rod 548 to complete the upward movement of the valve stem 236 whereupon the jacks move inwardly as indicated by the line O—P—Q—R—S. Near the ball lines of the shoes the rolls are tipped outwardly as represented by the portion P—Q of the line by the engagement of a finger 1096 (Fig. 52) with the finger 794. The movements of the jacks continue, however, and finally a pin 1098 on the disk 1048 engages the finger 794 to impart another tipping movement to each of the leveling rolls which movements are inwardly of the shoes. At the same time a pin 1100 on the disk 1048 engages the finger 564 to operate the valve 202 to reverse the swinging movements of the jacks. It will be noted that the jacks come to rest in their inward swinging movements at this time somewhat forwardly of the points G and J at the outer portion of the sole and it is for this reason that the pin 1100 is provided for operating the finger 564 instead of waiting for the rearward surface of the disk 1048 to engage the finger.

The jacks now carry the shoes outwardly as represented by the line S—T—U during the latter portion of which the rolls are tipped inwardly under the control of a finger 1102. These swinging movements of the jacks are interrupted when the ball lines of the shoes underlie the leveling rolls under the control of a finger 1104. The jacks again move inwardly as represented by the line U—V until a pin 1106 on the disk 1048 actuates the finger 564. The rolls are now tipped inwardly of the shoes again under the control of a pin 1108 on the disk 1048. Outward movements of the jacks continue as represented by the line W—X until a finger 1110 operates the finger 564 to reverse the movements. The jacks now move inwardly only a short distance as represented by the line X—Y until a finger 1112 actuates the finger 564 and the jacks continue their outward movements. During the time that the jacks move inwardly as represented by the line X—Y and then outwardly from Y to Z, the rolls are tipped outwardly under the control of a finger 1114. At this time the centers of pressure of the leveling rolls are along the center lines of the shoes and the jacks carry the shoes outwardly as represented by the line Z—AA. During the last part of this movement, just before the toe ends of the shoes engage the leveling rolls, the rod 492 (Fig. 11) is moved rearwardly thereby moving the valves 428 (Fig. 15) into the positions illustrated, whereupon the pistons 400 are moved upwardly thereby to lift the leveling rolls against the forces exerted by the springs 166, 168 so that the leveling rolls will not engage the extreme toe ends of the shoes.

The cycle of operation is completed as heretofore described by the engagement of the disk 1048 (Fig. 21) with the upper end of the lever 1068, thereby to operate the pressure-regulating valve to reduce the pressure in the system. The leveling rolls are tipped as represented by the line AA—A by the engagement of an inclined surface 1116 on the front face of the disk 1044 with the finger 794. This causes the rolls to be tipped outwardly of the shoe bottoms to the full extents of their movements thereby insuring that they will not get out of step but will move to the proper positions during the subsequent cycle of operations.

No adjustment is required to provide for shoes of different sizes other than the adjustment of the relative positions of the heel and toe posts as described heretofore inasmuch as this automatically takes care of the rate of movement of the control mechanism 566 along the shaft 576 during the inward and outward movements of the jacks. The adjustments afforded by the threaded rods 1064 control the relative extents of the swinging movements of the jacks so as to take care of variations in the relative lengths of shanks and foreparts of different styles of shoes. Should it be desired to provide an entirely different cycle of operation the control mechanism 566 is readily removable from the shaft 576 and may be replaced by a control mechanism having an arrangement of fingers to provide the desired cycle of operations. In the description of the movements of the jacks and leveling rolls no reference has been made to the operation of the valves 428 (Fig. 15) by the cam 770 (Fig. 25) to reduce the pressure of the rolls at the ball lines of the shoes inasmuch as the shoe represented in Fig. 53 is assumed to be a man's shoe and there would be no necessity for reducing the pressure of the rolls at the ball lines. In such event the cam 770 of Fig. 25 would be replaced by one having no cam surface on its rearward face. In leveling the bottoms of women's shoes a cam similar to that shown in Fig. 25 might be employed because of the sharp angle at the ball line thereby to reduce the shock of the rolls banging against the shoe bottom as they go over this angle from the forepart to the shank.

The control mechanism 566 which has been described in detail, controls the directions and extents of the swinging movements of the jacks and the times during the swinging movements of the jacks when the rolls begin their tipping movements. However, the extents and directions of the tipping movements of the leveling rolls are controlled by the mechanism 835 illustrated in Figs. 38 and 54 to 56. Integral with the gear 920 (Fig. 35) and extending forwardly thereof around the shaft 918 is a sleeve 1120 movable along the shaft with the gear. A disk 1122 on the sleeve is separated by a sleeve 1124 from a disk 1126 secured to the front end thereof, the disk and sleeve being secured by a key 1128 to the sleeve 1120 for sliding movement therewith along the shaft 918. Journaled in the disks 1122 and 1126 are a plurality of shafts S1 to S14, as shown in Fig. 54. Carried by these shafts are blocks 1130 having outwardly projecting fingers 1132 each of which is arranged to engage one or the other of the portions 904, 906 of the control members 900, 902 respectively (Fig. 36). As stated previously the direction of tipping movements of the leveling rolls depends upon which these control members is depressed which is in turn determined by the positions of the blocks 1130 on the shafts S1 to S14. Likewise the extents of the tipping movements are determined by the positions of the blocks along the shafts since these also control the release of the latch 880 (Fig. 39) in response to lengthwise movement of the control mechanism along the shaft 918 during the tipping movements of the leveling rolls.

It will be noted that the block 1130 on the shaft S14 is pinned thereto in a fixed position so that no adjustment of this block is possible. It is this block which controls the last tipping movements of the leveling rolls indicated by the line AA—A of Fig. 53. Since it is desired that the rolls also be tipped to the same final positions at the end of each cycle of operations, no provision is made for adjustment of this block.

It will be noted that the shafts S3, S4, S5 are interconnected by gears 1134 so that by turning the shaft S4 by a wrench applied to the squared head 1135 of the shaft, the shafts S3, S5 will be turned simultaneously therewith to the same extents. The screw threads on the shafts S3, S4 and S5 have different leads, the arrangement being such that upon rotating the shafts the block on the shaft S4 will travel twice as fast as that on the shaft S3 and the block on the shaft S5 will travel three times as fast as the block on the shaft S3. These three blocks control the tipping movements represented in Fig. 53 by the lines F—G, H—I and J—K respectively. These tipping movements are all outwardly of the shoe and of equal extent, consequently in order to maintain the extents of their tipping movements equal, the blocks are adjusted simultaneously and in the proportions indicated when it is desired to adjust the positions of the blocks to vary the extent of tipping movements in accordance with the requirements of the work being operated upon. The same arrangement is employed in connection with the shafts S10, S11 and S12, interconnected by gears 1136, the threads on the shafts S10, S11, and S12 having the same leads as the corresponding threads on the shafts S3, S4 and S5. These three blocks control respectively the tipping movements represented by the lines R—S, T—U and V—W.

The other shafts are all individually rotatable thereby to adjust the blocks carried thereby lengthwise thereof to permit variations in the extents of each of the tipping movements of the leveling rolls. It will be understood that this control mechanism is readily replaced by another when it is desired to change the cycle of operations by changing the mechanism 566 (Figs. 21 and 52) for another control mechanism.

From the above it will be seen that we have provided a fully automatic fluid-pressure-operated, two-station leveling machine in which no adjustment need be made in addition to the adjustments of the jacks, in order to accommodate shoes of different sizes. Variations in the styles of shoes are compensated for by adjustments in the control mechanisms themselves which are readily made. In order to change the cycle of operations in order to meet different requirements, the control mechanisms are readily removed and replaced by other control mechanisms. The leveling rolls are tipped slowly as the outer margins of the shoes are traversed and the cams for controlling these slow tipping movements and the stopping of the jacks, when the toe ends of the shoes are reached, are readily removed and replaced by others in order to vary this portion of the cycle of operations. Provision is also made for relieving the forces of the leveling rolls at predetermined times when traversing the ball lines of the shoes, this control being effected by a cam easily replaced to modify or eliminate this part of the cycle of operations.

Having thus described our invention, what we claim as new and desire to secure by Letters Patent of the United States is:

1. In a leveling machine, a shoe support, a leveling tool positioned when the machine is at rest out of engagement with a shoe on the support but in the path of movement thereof, and automatic means for first lifting the leveling tool and moving the support to carry the shoe beneath the tool and for subsequently imparting forward and rearward movements to the support with the tool in engagement with the shoe bottom to cause the tool to operate progressively along the shoe bottom in accordance with a predetermined cycle.

2. In a leveling machine, a shoe support, a leveling tool positioned when the machine is at rest out of engagement with a shoe on the support but in the path of movement thereof, and automatic means for first lifting the leveling tool and moving the support to carry the shoe beneath the tool and for subsequently imparting forward and rearward movements to the support with the tool in engagement with the shoe bottom to cause the tool to operate progressively along the shoe bottom in accordance with a predetermined cycle and finally returning the shoe support and leveling tool to their initial positions.

3. In a leveling machine, a shoe support, a leveling tool positioned when the machine is at rest out of engagement with a shoe on the support but in the path of movement thereof, and automatic means for first lifting the leveling tool and moving the support to carry the shoe beneath the tool and for subsequently imparting forward and rearward movements to the support with the tool in engagement wtih the shoe bottom to cause the tool to operate progressively along the shoe bottom in accordance with a predetermined cycle and to tip the tool into selected angular positions relatively to the shoe bottom at predetermined times in the operation of the tool on the bottom of the shoe.

4. In a leveling machine, a leveling tool, a shoe support, said support and tool being located initially out of operative relation to each other, power-operated means for imparting to said support and tool first movements from their initial positions to cause the tool to engage the bottom of a shoe on said support followed by relative movements in opposite directions lengthwise of the shoe to cause the tool to operate progressively along the shoe bottom, a member movable by the operator to start said power-operated means, and automatic means for operating said member reversely to stop said power-operating means when the support and tool have returned to their initial starting positions.

5. In a leveling machine, a leveling tool, a shoe support, said support and tool being located initially out of operative relation to each other, power-operated means for imparting to said support and tool first movements from their initial positions to cause the tool to engage the bottom of a shoe on said support followed by relative movements in opposite directions lengthwise of the shoe to cause the tool to operate progressively along the shoe bottom, a member movable by the operator to start said power-operated means, and connections between said power-operated means and the member for moving said member reversely to stop said power-operated means with the support and tool in their initial positions.

6. In a leveling machine, a leveling tool, a shoe support, power-operated means for effecting relative movements of said support and tool in opposite directions lengthwise of a shoe on said support to cause the tool to operate progressively along the shoe bottom, automatic means for controlling said power-operated means to cause a predetermined number of relative movements each of a predetermined extent to be imparted to said support and tool, and a member movable in one direction manually to start said power-operated means in operation and thereafter movable reversely by power under the control of said automatic means to stop said power-operated means at the end of the leveling operation.

7. In a leveling machine, a leveling tool, a shoe support, automatic means for effecting relative movements of said shoe support and the leveling tool lengthwise of a shoe on said support to cause the tool to operate progressively along the shoe bottom in accordance with a predetermined schedule, a toggle, means operative in response to straightening of said toggle for supplying power to initiate operation of said first-named means, means for holding said toggle in straightened condition, means for breaking said toggle at the conclusion of the leveling operation to interrupt the supply of power to said first-named means, and means operative at the conclusion of the leveling operation for rendering said last-named means ineffective to lock the toggle in its broken position.

8. In a leveling machine, a leveling tool, a shoe support, automatic means for effecting relative movements of said shoe support and the leveling tool lengthwise of a shoe on said support to cause the tool to operate progressively along the shoe bottom in accordance with a predetermined schedule, a treadle, a toggle, means operative in response to depression of said treadle for straightening said toggle, means operated by said toggle when in straightened position for supplying power to operate said first-named means, means for maintaining said toggle in its straightened position, and means operative automatically at the conclusion of the leveling operation for breaking the toggle and cutting off the supply of operating power.

9. In a leveling machine, a shoe support movable to carry a shoe mounted thereon into position to be operated upon, a leveling tool for thereafter operating upon the shoe, mechanism arranged to be operated by pressure of fluid against it for effecting such movement of the shoe support, a treadle, and means operative upon depression of the treadle for increasing the pressure of the operating fluid to operate said mechanism.

10. In a leveling machine, a shoe support movable to carry a shoe mounted thereon into position to be operated upon, a leveling tool for thereafter operating upon the shoe, mechanism arranged to be operated by pressure of fluid against it for effecting such movement of the shoe support, a toggle, means operative upon straightening of said toggle for increasing the pressure of the operating fluid, a treadle, means connecting said treadle to said toggle for straightening the toggle upon depression of the treadle, means for maintaining the toggle straight, and means for breaking the toggle at the conclusion of the leveling operation.

11. In a leveling machine, a leveling tool, a shoe support, fluid-pressure means for effecting relative movements of the shoe support and the leveling tool lengthwise of a shoe on said support to cause the tool to operate progressively along the shoe bottom, and means automatically controlling said fluid-pressure means to cause a plurality of said relative movements to be imparted to said support and tool, each of a predetermined extent and in a predetermined direction.

12. In a leveling machine, a leveling tool, a shoe support, fluid-pressure means for moving said support lengthwise of a shoe thereon to cause the tool to operate progressively along the shoe bottom, and mechanism automatically controlling said fluid-pressure means to determine the direction and extent of each swinging movement and to determinate the operation after a predetermined number of such movements.

13. In a leveling machine, a leveling tool, a shoe support, fluid-pressure means for moving said support lengthwise of a shoe thereon to cause the tool to operate progressively along the shoe bottom, fluid-pressure means for rocking said tool relatively to said support, and means in control of each of said fluid-pressure means to determine automatically the directions and extents of the movements of the support and tool in accordance with a predetermined schedule.

14. In a leveling machine, a leveling tool, a shoe support, fluid-pressure means for moving said support lengthwise of a shoe thereon to cause the tool to operate progressively along the shoe bottom, fluid-pressure means for rocking said tool relatively to said support, and means in control of each of said fluid-pressure means to determine automatically the directions and extents of the movements of the support and tool in accordance with a predetermined schedule and to terminate the leveling operation after a predetermined number of such movements.

15. In a leveling machine, a leveling tool, a shoe support movable in directions lengthwise of a shoe on the support to cause the tool to operate progressively along the shoe bottom, means urging said leveling tool in a direction to apply pressure to the shoe bottom, power-operated means for moving said support into operative relation to said leveling tool and for thereafter imparting swinging movements to the support in the leveling operation, and means operative in response to the initial application of power to said power-operated means to move the support into operative relation to the leveling tool for moving the leveling tool in a direction away from the shoe bottom until the support has carried the shoe into operative relation thereto.

16. In a leveling machine, a leveling tool, a shoe support movable in directions lengthwise of a shoe on the support to cause the tool to operate progressively along the shoe bottom, means urging said leveling tool in a direction to apply pressure to the shoe bottom, a fluid-pressure motor for moving said support into operative relation to said leveling tool and for thereafter imparting swinging movements to the support in the leveling operation, a fluid-pressure motor for lifting said leveling tool against the action of the first-named means, and means for simultaneously applying operating pressure to each of said fluid-pressure motors.

17. In a leveling machine, a leveling tool, a shoe support movable in directions lengthwise of a shoe on the support to cause the tool to operate progressively along the shoe bottom, means urging said leveling tool in a direction to apply pressure to the shoe bottom, a fluid-pressure motor for moving said support into operative relation to said leveling tool and for thereafter imparting swinging movements to the support in the leveling operation, a fluid-pressure motor for lifting said leveling tool against the action of the first-named means, means for simultaneously applying operating pressure to each of said fluid-pressure motors, and means operated by movement of the support into operative relation to said tool for interrupting the application of pressure to said last-named motor whereby the leveling tool is under the control of said first-named means.

18. In a leveling machine, a leveling tool, a shoe support, fluid-pressure means for effecting relative movement of said shoe support and leveling tool in opposite directions lengthwise of a shoe on said support to cause the tool to operate progressively along the shoe bottom, means for directing fluid under pressure to said fluid-pressure means, means for controlling the flow of pressure fluid to said fluid-pressure means to control the direction and extent of said movements, and means operable automatically after a predetermined number of relative movements have been imparted to said support and tool for decreasing the pressure of fluid to said fluid-pressure means thereby to terminate the leveling operation.

19. In a leveling machine, a leveling tool, a shoe support, fluid-pressure means for effecting relative movement of said shoe support and leveling tool in opposite directions lengthwise of a shoe on said support to cause the tool to operate progressively along the shoe bottom, means for directing fluid under pressure to said fluid-pressure means, means for controlling the flow of pressure fluid to said fluid-pressure means to control the direction and extent of said movements, means operable automatically after a predetermined number of relative movements have been imparted to said support and tool for decreasing the pressure of fluid to said fluid-pressure means thereby to terminate the leveling operation, and means operable prior to the operation of said last-named means for causing a relative movement of separation of the tool and shoe support.

20. In a leveling machine, a leveling tool, a shoe support, fluid-pressure means for effecting relative movement of said support and the leveling tool lengthwise of a shoe on said support to cause the tool to operate progressively along the shoe bottom, valve means for controlling said fluid-pressure means, and automatic means for controlling said valve means to cause a predetermined number of relative movements each of a predetermined extent to be imparted to said support and tool in the course of the operation of the tool on the bottom of the shoe.

21. In a leveling machine, a leveling tool, a shoe support, fluid-pressure means for effecting relative movement of said shoe support and the leveling tool lengthwise of a shoe on the support to cause the tool to operate progressively along the shoe bottom, valve means for controlling said fluid-pressure means, and means for controlling said valve means including a member movable by the operator to start said fluid-pressure means in operation, and a device for thereafter determining automatically the number and extent of the relative movements of the support and tool.

22. In a leveling machine, a leveling tool, a shoe support, fluid-pressure means for moving said shoe support in opposite directions lengthwise of a shoe on said support to cause the tool to operate progressively along the shoe bottom, valve means for controlling said fluid-pressure means, and automatic means for controlling said valve means to cause a predetermined number of movements of the shoe support, each of a predetermined extent, to be imparted to said support in the course of the operation of the tool on the bottom of the shoe.

23. In a leveling machine, a leveling tool, a shoe support, fluid-pressure means for effecting relative movements of said support and tool lengthwise of a shoe on the support to cause the tool to operate progressively along the shoe bottom, a valve mechanism in control of said fluid-pressure means, and reciprocating mechanism for automatically operating said valve to reverse the fluid-pressure means a plurality of times at several different predetermined points in the operation of the tool on the bottom of the shoe to cause a predetermined number of relative movements of predetermined extent of said support and leveling tool in the course of the leveling operation.

24. In a leveling machine, a leveling tool and a shoe support relatively movable in directions lengthwise of a shoe on the support to cause the leveling tool to operate progressively along the shoe bottom, fluid-pressure means for effecting such relative movements of the support and tool, a valve in control of said fluid-pressure means, and an intermittently movable device for automatically operating said valve to determine the number of relative movements of said support and leveling tool and the extent of each relative movement.

25. In a leveling machine, a leveling tool, a shoe support, fluid-pressure means for moving said shoe support in opposite directions lengthwise of a shoe thereon to cause said leveling tool to operate progressively along the shoe bottom, a valve controlling the flow of pressure fluid to said fluid-pressure means, and means controlling said valve including mechanism operative in response to the movements of the shoe support for reversing said fluid-pressure means at several different points spaced lengthwise of the shoe in the operation of the tool on the bottom of the shoe.

26. In a leveling machine, a leveling tool, a shoe support mounted for movements in opposite directions lengthwise of a shoe thereon to cause the tool to operate progressively along the shoe bottom, fluid-pressure means for tipping said leveling tool in opposite directions laterally of the shoe, valve means for controlling said fluid-pressure means, and automatic means for controlling said valve means to cause tipping movements of the leveling tool at definite points in the operation of the tool on the bottom of the shoe and for determining the direction and extent of each tipping movement.

27. In a leveling machine, a leveling tool, a shoe support mounted for movements in opposite directions lengthwise of a shoe thereon to cause the tool to operate progressively along the shoe bottom, fluid-pressure means for tipping said leveling tool in opposite directions laterally of the shoe, valve means for controlling said fluid-pressure means, means operated at predetermined points in the operation of the tool on the bottom of the shoe for operating said valve means to cause a tipping movement of the leveling tool, and means cooperating with said last-named means in its operation of the valve for determining the direction and extent of each tipping movement.

28. In a leveling machine, a leveling tool and a shoe support relatively movable in opposite directions lengthwise of a shoe on said support to cause the tool to operate progressively along the shoe bottom, fluid-pressure means for tipping said leveling tool in opposite directions laterally of the shoe, valve means for starting said fluid-pressure means in operation at definite points in the operation of the tool on the bottom of the shoe, and control means for said valve means comprising a device for determining the direction of each tipping movement of the tool, said device being movable simultaneously with the tool and being arranged by the extent of its movement to determine the extent of each tipping movement of the tool.

29. In a leveling machine, a leveling tool, a shoe support mounted for swinging movements in opposite directions lengthwise of a shoe thereon to cause the tool to operate progressively along the shoe bottom, fluid-pressure means for tipping said leveling tool in opposite directions laterally of the shoe, a valve controlling the application of pressure fluid to said fluid-pressure means, a device connected to said shoe support to move simultaneously therewith and arranged to operate said valve at a predetermined time in each swinging movement of the support, and additional means for controlling said valves to determine the direction and extent of each tipping movement of the leveling tool.

30. In a leveling machine, a leveling tool, a shoe support mounted for swinging movements in opposite directions lengthwise of a shoe thereon to cause the tool to operate progressively along the shoe bottom, fluid-pressure means for tipping said tool in opposite directions laterally of the shoe, a valve controlling the flow of pressure fluid to said fluid-pressure means, a device connected to said shoe support to move simultaneously therewith and arranged to operate said valve at a predetermined time in each swinging movement of the support, and a second device for determining the direction of each tipping movement of the tool, said second device being movable simultaneously with the tool and being arranged to operate said valve to interrupt operation of said fluid-pressure means after a tipping movement of adjustably variable extent has been imparted to said leveling tool.

31. In a leveling machine, a leveling tool, a shoe support, fluid-pressure means for swinging said shoe support in opposite directions lengthwise of a shoe thereon to cause the tool to operate progressively along the shoe bottom, a valve controlling the flow of pressure fluid to said fluid-pressure means, a second fluid-pressure means for tipping said leveling tool in opposite directions laterally of the shoe, a second valve controlling the flow of pressure fluid to said second fluid-pressure means, a device connected to said shoe support to move simultaneously therewith for controlling said first-named valve to cause a predetermined number of swinging movements of predetermined extent to be imparted to said shoe support, mechanism arranged to be operated by said device for operating said second valve at a predetermined time in each swinging movement of the support, and a second device for controlling said mechanism to determine the direction of each tipping movement of the tool and for bringing said second fluid-pressure means to a stop after a tipping movement of predetermined extent has been imparted to the leveling tool.

32. In a leveling machine, a leveling tool and a shoe support relatively movable in opposite directions lengthwise of a shoe on the support to cause the tool to operate progressively along the shoe bottom, said leveling tool being mounted for tipping movements in opposite directions laterally of the shoe, fluid-pressure means for thus causing tipping movements of the leveling tool, a valve in control of said fluid-pressure means, and means for operating said valve to cause to be imparted to the leveling tool in response to the relative movement of the support and tool a continuous tipping movement in a predetermined direction in operating upon a portion of the bottom of the shoe.

33. In a leveling machine, a leveling tool and a shoe support relatively movable in opposite directions lengthwise of a shoe on the support to cause the tool to operate progressively along the shoe bottom, fluid-pressure means for imparting to said leveling tool tipping movements of different extents in opposite directions laterally of the shoe at definite points in the operation of the tool on the bottom of the shoe, a valve in control of said fluid-pressure means, and means controlling said valve to cause a continuous tipping movement laterally of the shoe to be imparted to said leveling tool in response to the relative movement of the support and tool in operating along a selected portion of the bottom of the shoe.

34. In a leveling machine, a leveling tool and a shoe support relatively movable in opposite directions lengthwise of a shoe on the support to cause the tool to operate progressively along the shoe bottom, fluid-pressure means arranged to act automatically at different points in the operation of the tool on the bottom of the shoe to impart to the tool at a comparatively rapid rate a tipping movement of predetermined extent in a predetermined direction, valve means in control of said fluid-pressure means, and means controlling said valve means for causing tipping of the leveling tool continuously at a comparatively slow rate during the operation of the tool upon a selected portion of the shoe bottom.

35. In a leveling machine, a leveling tool, a shoe support movable in directions lengthwise of a shoe on the support to cause said leveling tool to operate progressively along the shoe bottom, fluid-pressure means for thus moving the shoe support, fluid-pressure means for tipping the leveling tool in opposite directions laterally of the shoe to vary its inclination in operating upon different portions of the shoe bottom, valve means in control of each of said fluid-pressure means, and means automatically controlling said valve means to cause a continuous tipping movement to be imparted to said leveling tool as the tool is operating upon a selected portion of the shoe bottom.

36. In a leveling machine, a leveling tool, a shoe support movable in directions lengthwise of a shoe on the support to cause said leveling tool to operate progressively along the shoe bottom, fluid-pressure means for thus moving the shoe support, fluid-pressure means for tipping the leveling tool in opposite directions laterally of the shoe to vary its inclination in operating upon different portions of the shoe bottom, valve means in control of each of said fluid-pressure means, means automatically operating said valve means to cause movements of said support of predetermined directions and extents in accordance with a predetermined cycle and for tipping said leveling tool at predetermined points in the operation of the tool on the bottom of the shoe, and means also in control of said valve means for causing a continuous tipping movement to be imparted to said leveling tool as the tool is operating along a selected portion of the shoe bottom.

37. In a leveling machine, a leveling tool, a shoe support movable in directions lengthwise of a shoe on the support to cause said leveling tool to operate progressively along the shoe bottom, fluid-pressure means for thus moving the shoe support, fluid-pressure means for tipping the leveling tool in opposite directions laterally of the shoe to vary its inclination in operating upon different portions of the shoe bottom, a valve controlling the flow of pressure-fluid to the first-named fluid-pressure means movable between extreme positions in which said fluid-pressure means moves the support in one direction or the other and having a mid-position in which no fluid flows to said first fluid-pressure means, a valve controlling the flow of pressure fluid to the second-named fluid-pressure means and movable from a mid-position in which no fluid flows to the second fluid-pressure means into either of two extreme positions in which the fluid-pressure means tips the tool in one direction or the other, and automatic means in control of each of said valves.

38. In a leveling machine, a leveling tool, a shoe support movable in directions lengthwise of a shoe on the support to cause said leveling tool to operate progressively along the shoe bottom, fluid-pressure means for thus moving the shoe support, fluid-pressure means for tipping the leveling tool in opposite directions laterally of the shoe to vary its inclination in operating upon different portions of the shoe bottom, a valve controlling the flow of pressure fluid to the first-named fluid-pressure means movable between extreme positions in which said fluid-pressure means moves the support in one direction or the other and having a mid-position in which no fluid flows to said first fluid-pressure means, a second valve controlling the flow of pressure fluid to the second-named fluid-pressure means and movable from a mid-position in which no fluid flows to the second fluid-pressure means into either of two extreme positions in which the fluid-pressure means tips the tool in one direction or the other, and automatic means in control of each of said valves, said last-named means including means for moving the second valve only part way toward one extreme position to cause a slow tipping movement to be imparted to the leveling tool in operating on a selected portion of the shoe.

39. In a leveling machine, a leveling tool, a shoe support movable in directions lengthwise of a shoe on the support to cause said leveling tool to operate progressively along the shoe bottom, fluid-pressure means for thus moving the shoe support, fluid-pressure means for tipping the leveling tool in opposite directions laterally of the shoe to vary its inclination in operating upon different portions of the shoe bottom, a valve controlling the flow of pressure fluid to the first-named fluid-pressure means movable between extreme positions in which said fluid-pressure means moves the support in one direction or the other and having a mid-position in which no fluid flows to said first fluid-pressure means, a second valve controlling the flow of pressure fluid to the second-named fluid-pressure means and movable from a mid-position in which no fluid flows to the second fluid-pressure means into either of two extreme positions in which the fluid-pressure means tips the tool in one direction or the other, and automatic means in control of each of said valves, said last-named means including means for moving the second valve only part way toward one extreme position to cause a slow tipping movement to be imparted to the leveling tool in operating on a selected portion of the shoe, and means for thereafter moving the first valve into its mid-position and the second valve into the other extreme position while operating on the toe end of the shoe.

40. In a twin leveling machine, a pair of leveling tools, a pair of shoe supports movable to carry shoes mounted thereon into positions to be operated upon by the leveling tools, said shoe supports each comprising a heel support and a toe support, means for moving said shoe supports in unison lengthwise of the shoes thereon, and a single means for simultaneously varying the distances between the heel support and the toe support of both shoe supports to accommodate shoes of different sizes.

41. In a twin leveling machine, a pair of leveling tools, a pair of shoe supports movable to carry shoes mounted thereon into positions to be operated upon by the leveling tools, said shoe supports each comprising a heel support and a toe support, means for moving said shoe supports in unison lengthwise of the shoes thereon, a single means for simultaneously varying the distances between the heel support and the toe support of both shoe supports to accommodate shoes of different sizes, and individual means associated with each shoe support for moving the heel support to force the shoe firmly into engagement with the toe support.

42. In a twin leveling machine, a pair of leveling tools, a pair of shoe supports movable to carry shoes mounted thereon into positions to be operated upon by the leveling tools, means for moving said shoe supports in unison lengthwise of the shoes thereon forwardly and rearwardly in accordance with a predetermined schedule, a single means for simultaneously varying the distances between the heel and toe supports of both shoe supports to accommodate shoes of different sizes, and means operated by said last named means for controlling the extents of the different swinging movements of the shoe supports.

43. In a twin leveling machine, a pair of leveling tools, a pair of shoe supports movable to carry shoes thereon into positions to be operated upon by the leveling tools, fluid-pressure means for moving said shoe supports in unison lengthwise of the shoes thereon to cause the tools to operate progressively along the shoe bottoms, said shoe supports each comprising a heel support and a toe support, means for simultaneously varying the distances between the heel and toe supports of both shoe supports to accommodate shoes of different sizes, mechanism controlling the said fluid-pressure means to determine the direction and extent of each swinging movement, and means operated by the means for varying the distances between the heel and toe supports for modifying the action of said last named fluid-pressure means to vary the extent of the various swinging movements in accordance with the size of the shoes being operated upon.

44. In a leveling machine, a leveling tool, a shoe support comprising heel and toe supports, said toe support being adjustable about an axis extending laterally of the shoe and located substantially at the toe-engaging surface of the support, means for swinging said shoe support into cooperative relation to the leveling tool, and means operative in response to said swinging movement for locking the toe support in the proper position of adjustment.

45. In a leveling machine, a leveling tool, a shoe support comprising heel and toe supports, said toe support being adjustable about an axis extending laterally of the shoe and located substantially at the toe-engaging surface of the support, means for swinging said shoe support to carry the shoe into cooperative relation to the leveling tool, locking means associated with said toe support to lock it in the proper position of adjustment, an arm operatively connected to said locking means, a cam roll carried by said arm, and a member carried by the frame of the machine having a cam surface engageable by said cam roll in response to movement of the support into operative relation to the leveling tool for operating said locking means.

46. In a leveling machine, a leveling tool, a shoe support comprising heel and toe supports, said toe support being adjustable about an axis extending laterally of the shoe located substantially at the toe-engaging surface of the support, said shoe support also including an additional support for the shoe between the heel end and forepart movable to a position determined by the shoe by pressure of the shoe on said additional support, and means operative in response to swinging movement of the shoe support into cooperative relation to the leveling tool for locking said toe support in the proper position of adjustment and for forcing said additional support more firmly against the shoe.

FRED V. HART.
FRED L. MOONEY.

REFERENCES CITED

The following references are of record in the file of this patent:

UNITED STATES PATENTS

| Number | Name | Date |
|---|---|---|
| 2,322,334 | Winkley | June 22, 1943 |
| 2,347,666 | Clark | May 2, 1944 |